US008600949B2

(12) United States Patent  
Periyagaram et al.

(10) Patent No.: US 8,600,949 B2
(45) Date of Patent: Dec. 3, 2013

(54) DEDUPLICATION IN AN EXTENT-BASED ARCHITECTURE

(75) Inventors: Subramaniam Periyagaram, San Jose, CA (US); Sandeep Yadav, Santa Clara, CA (US); Blake Lewis, Los Altos Hills, CA (US); Rickard E. Faith, Hillsborough, NC (US); Ashish Prakash, Morrisville, NC (US); Ram Kesavan, Los Altos, CA (US); Ananthan Subramanian, Menlo Park, CA (US)

(73) Assignee: NetApp, Inc., Sunnyvale, CA (US)

( * ) Notice: Subject to any disclaimer, the term of this patent is extended or adjusted under 35 U.S.C. 154(b) by 82 days.

(21) Appl. No.: 13/165,631

(22) Filed: Jun. 21, 2011
(Under 37 CFR 1.47)

(65) Prior Publication Data
US 2012/0330903 A1    Dec. 27, 2012

(51) Int. Cl.
*G06F 17/30* (2006.01)

(52) U.S. Cl.
USPC .......................................................... 707/664

(58) Field of Classification Search
USPC .......................................................... 707/692
See application file for complete search history.

(56) References Cited

U.S. PATENT DOCUMENTS

| 7,321,962 | B1 | 1/2008 | Fair et al. |
| 7,562,203 | B2 | 7/2009 | Scott et al. |
| 7,664,791 | B1 | 2/2010 | Hamilton |
| 7,702,870 | B2 | 4/2010 | English et al. |
| 7,730,277 | B1 | 6/2010 | Prakash et al. |
| 7,870,172 | B1 | 1/2011 | Sarma |
| 8,037,349 | B2 * | 10/2011 | Mandagere et al. ........... 714/6.3 |
| 2005/0108296 | A1 | 5/2005 | Nakamura et al. |
| 2007/0130431 | A1 | 6/2007 | Sano |
| 2009/0265399 | A1 | 10/2009 | Cannon et al. |
| 2010/0094817 | A1 | 4/2010 | Ben-Shaul et al. |
| 2010/0131480 | A1 | 5/2010 | Schneider |
| 2010/0274772 | A1 | 10/2010 | Samuels |
| 2011/0016095 | A1 * | 1/2011 | Anglin et al. ................. 707/692 |
| 2011/0055621 | A1 * | 3/2011 | Mandagere et al. ............... 714/4 |
| 2012/0330903 | A1 * | 12/2012 | Periyagaram et al. ........ 707/692 |

FOREIGN PATENT DOCUMENTS

WO    WO 2010/040078 A2    4/2010

* cited by examiner

*Primary Examiner* — Baoquoc N To
(74) *Attorney, Agent, or Firm* — Blakely, Sokoloff, Taylor & Zafman LLP

(57) ABSTRACT

A request is received to remove duplicate data. A log data container associated with a storage volume in a storage server is accessed. The log data container includes a plurality of entries. Each entry is identified by an extent identifier in a data structures stored in a volume associated with the storage server. For each entry in the log data container, a determination is made if the entry matches another entry in the log data container. If the entry matches another entry in the log data container, a determination is made of a donor extent and a recipient extent. If an external reference count associated with the recipient extent equals a first predetermined value, block sharing is performed for the donor extent and the recipient extent. A determination is made if the reference count of the donor extent equals a second predetermined value. If the reference count of the donor extent equals the second predetermined value, the donor extent is freed.

26 Claims, 14 Drawing Sheets

DEDUPLICATION IN AN EXTENT-BASED ARCHITECTURE

FIELD OF THE INVENTION

This invention relates generally to data storage systems, and more particularly to deduplication in an extent-based data storage system.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2011, NetApp, Inc., All Rights Reserved.

BACKGROUND

Various forms of network-based storage systems exist today. These forms include network attached storage (NAS), storage area networks (SAN's), and others. Network-based storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems (clients). In the context of NAS, a storage server may be a file server, which is sometimes called a "filer". A filer operates on behalf of one or more clients to store and manage shared files. The files may be stored in a storage system that includes one or more arrays of mass storage devices, such as magnetic or optical disks or tapes, by using a data storage scheme such as Redundant Array of Inexpensive Disks (RAID). Additionally, the mass storage devices in each array may be organized into one or more separate RAID groups. In a SAN context, a storage server provides clients with block-level access to stored data, rather than file-level access. Some storage servers are capable of providing clients with both file-level access and block-level access, such as certain storage servers made by NetApp, Inc. (NetApp®) of Sunnyvale, Calif.

FIG. 1 is a prior art illustrative embodiment of a Write Anywhere File Layout (WAFL) file system. Referring to FIG. 1, WAFL aggregate 100 is an instance of the WAFL file system. WAFL aggregate 100 includes one or more flexible volumes 110, one or more volume containers 120, and physical storage 130.

WAFL aggregate 100 is a physical storage container that can store data in the WAFL file system. Flexible volume 110 is a logical volume that allows the virtualization of the allocation of volumes on physical storage 130. Thereby multiple, independently managed flexible volumes 110 can share the same physical storage (e.g., physical storage 130). The virtualization requires mapping between virtual volume block numbers (VVBNs) used by flexible volume 110 and physical volume block numbers (PVBNs) used by WAFL aggregate 100 to access data stored in physical storage 130. A PVBN, as used herein, refers disk blocks that have been abstracted into a single linear sequence in the aggregate. Each volume container 120 corresponds to a flexible volume 110. Volume container 120 contains all the data blocks for a corresponding flexible volume 110.

As used herein, a block offset or an offset refers to a distance in blocks from the beginning of a storage object such as a volume, file, extent, etc. Block addresses used within flexible volume 110 refer to block offsets within volume container 120. Since volume container 120 contains every block within flexible volume 110, there are two ways to refer to the location of a particular block. The PVBN specifies the location of a block within WAFL aggregate 100. The VVBN specifies the offset of the block within the container file. When a block in a file is requested, flexible volume 110 translates the file offset into a VVBN. The VVBN is passed from flexible volume 110 to volume container 120. Volume container 120 translates the VVBN to a PBVN. The PVBN is then used to access the requested block in physical storage 130. Additionally, when a PVBN is initially written, the block pointer for the PVBN in flexible volume 110 is written to include (e.g., in a cache) the PVBN for the VVBN. Thereby, when the requested block is required, the flexible volume 110 can use the stored PVBN to access physical storage 130.

Current implementations of WAFL define a file as a tree of indirect blocks. Each indirect block in the tree has a fixed span: a fixed number of entries, each pointing to another block in the tree. Extents are represented using an entry for each block within the extent. An extent, as used herein, refers a contiguous group of one or more blocks. As a result, the amount of indirect block metadata is linear with respect to the size of the file. Additionally, disk gardening techniques, such as segment cleaning, file reallocation, etc., are complicated by caching PVBN pointers in VVBN blocks.

Storage systems often use a predetermined block size for all internal operations. For example, WAFL uses 4 KB (e.g., 4096 bytes) blocks for both VVBN and PVBN, as do client-side file systems for file block numbers (FBN). Block boundaries are expected to occur every 4 KB from an initial offset (e.g., FBN 0). Since file systems usually offset individual files based on these block boundaries, application writers take advantage of a file system's block size and alignment to increase the performance of their input/output ("I/O") operations—for example, always performing I/O operations that are a multiple of 4 KB, and always aligning these operations to the beginning of a file. Other file systems or applications, such as a virtual machine, may use a block boundary of a different size (e.g., a virtual machine environment in which an initial master boot record block of 512 bytes is followed by the expected 4 KB blocks), resulting in misalignment between FBN's and PVBN's. Additionally, multiple virtual machines may share a single volume container 120 and each virtual machine may misaligned by a different amount.

Storage servers may implement a deduplication algorithm Deduplication eliminates redundant copies of data that is stored within the data storage. Deduplication is accomplished in several ways, including hierarchical deduplication, in-line deduplication, and background deduplication.

Hierarchical deduplication includes deriving one file from another, usually by one file starting off as copy of another, but zero or nearly zero bytes of data are actually copied or moved. Instead, the two files share common blocks of data storage. An example is a snapshot, where a snapshot is made of a file system, such that the snapshot and active file system are equal at the time snapshot is taken, and share the same data storage, and thus are effectively copies that involve zero or near zero movement of data. As the source file system changes, the number of shared blocks of data storage reduces. A variation of this is a writable snapshot (also referred to as a clone)

which is taken of a file system. In this variation as the source and cloned file systems each change, there are fewer shared blocks.

In-line deduplication includes a storage access protocol initiator (e.g. an NFS client) creating content via write operations, while the target of the storage access protocol checks if the content being written is duplicated somewhere else on the target's storage. If so, the data is not written. Instead, the logical content (e.g., metadata, pointer, etc.) refers to the duplicate.

Background deduplication includes a background task (e.g., on a storage access protocol target) scanning for duplicate blocks, freeing all but one of the duplicates, and mapping corresponding pointers (or other logical content) from the now free blocks to the remaining duplicate.

However, these existing deduplication algorithms allow for sharing of data storage, but have an impact on performance of the system since the data must be processed as it is received. Furthermore, metadata used by the active file system and snapshots is not deduplicated, thereby not maximizing the space efficiency of the active file system and snapshots.

SUMMARY

Deduplication in an extent-based architecture is performed by receiving a request to remove duplicate data. A log data container associated with a storage volume in a storage server is accessed. The log data container includes a plurality of entries. Each entry is identified by an extent identifier in a data structures stored in a volume associated with the storage server. For each entry in the log data container, a determination is made if the entry matches another entry in the log data container. If the entry matches another entry in the log data container, a determination is made of a donor extent and a recipient extent. If an external reference count associated with the recipient extent equals a first predetermined value, block sharing is performed for the donor extent and the recipient extent. A determination is made if the reference count of the donor extent equals a second predetermined value. If the reference count of the donor extent equals the second predetermined value, the donor extent is freed.

BRIEF DESCRIPTION OF THE DRAWINGS

The present invention is illustrated by way of example, and not by way of limitation, in the figures of the accompanying drawings.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Embodiments are described for deduplication in an extent-based architecture. References in this specification to "an embodiment", "one embodiment", or the like, mean that the particular feature, structure or characteristic being described is included in at least one embodiment of the present invention. Occurrences of such phrases in this specification do not necessarily all refer to the same embodiment, nor are they necessarily mutually exclusive.

Deduplication in an extent-based architecture is performed by receiving a request to remove duplicate data in a storage server. A log data container associated with a storage volume in the storage server is accessed. The log data container includes a plurality of entries. Each entry is identified by an extent identifier in a data structures stored in a volume associated with the storage server. For each entry in the log data container, a determination is made if the entry matches another entry in the log data container. If the entry matches another entry in the log data container, a determination is made of a donor extent and a recipient extent. If an external reference count associated with the recipient extent equals a first predetermined value, block sharing is performed for the donor extent and the recipient extent. A determination is made if the reference count of the donor extent equals a second predetermined value. If the reference count of the donor extent equals the second predetermined value, the donor extent is freed. Deduplication in an extent-based architecture is not required to be performed inline as data arrives. Therefore, deduplication in an extent-based architecture is performed after the data has been written. Moreover, metadata associated with the data, such as extents, can be deduplicated, thereby allowing for more space efficiency.

Figure 1:
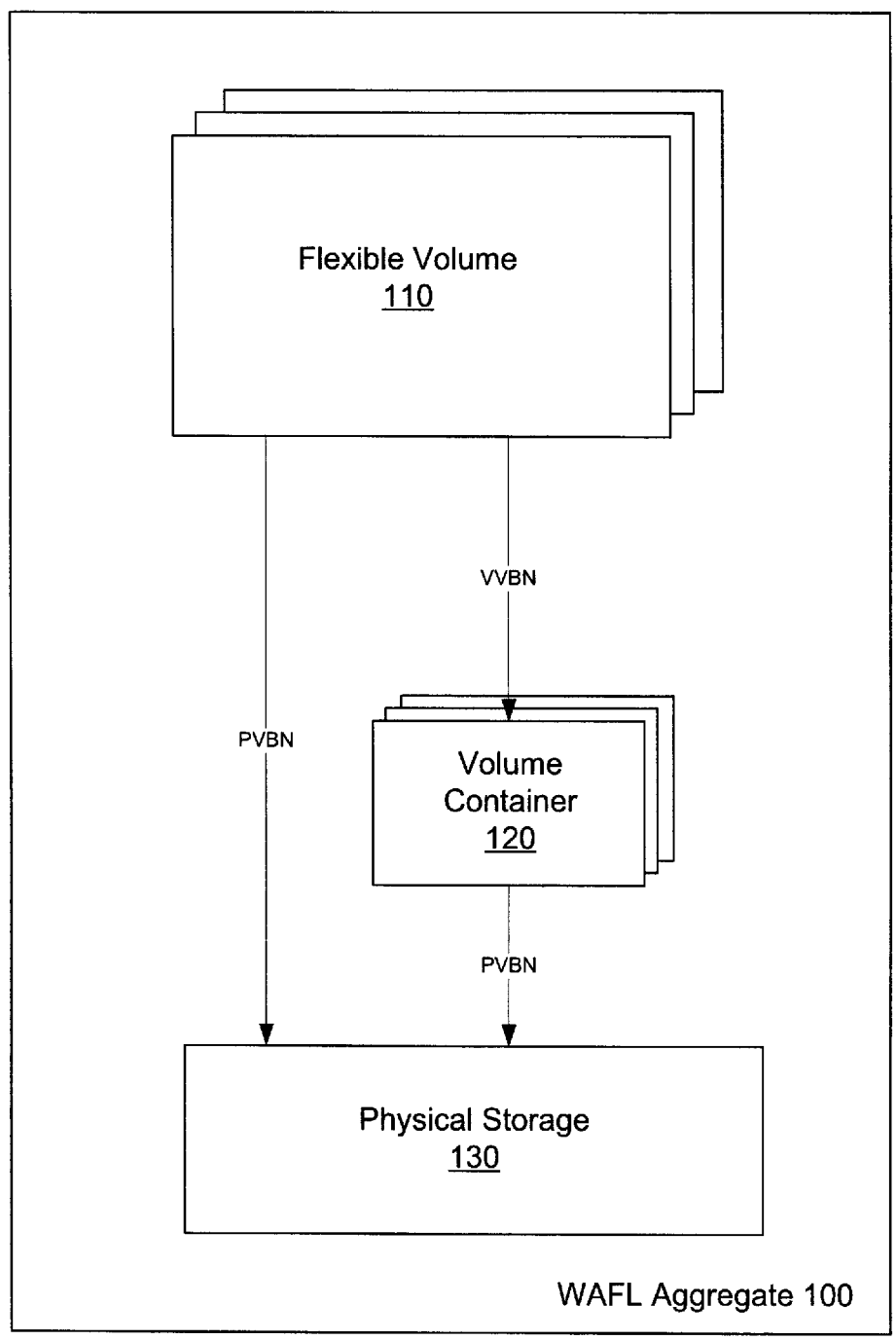
FIG. 1 illustrates a prior art exemplary implementation of an embodiment of a Write Anywhere File Layout (WAFL)
Figure 2A:
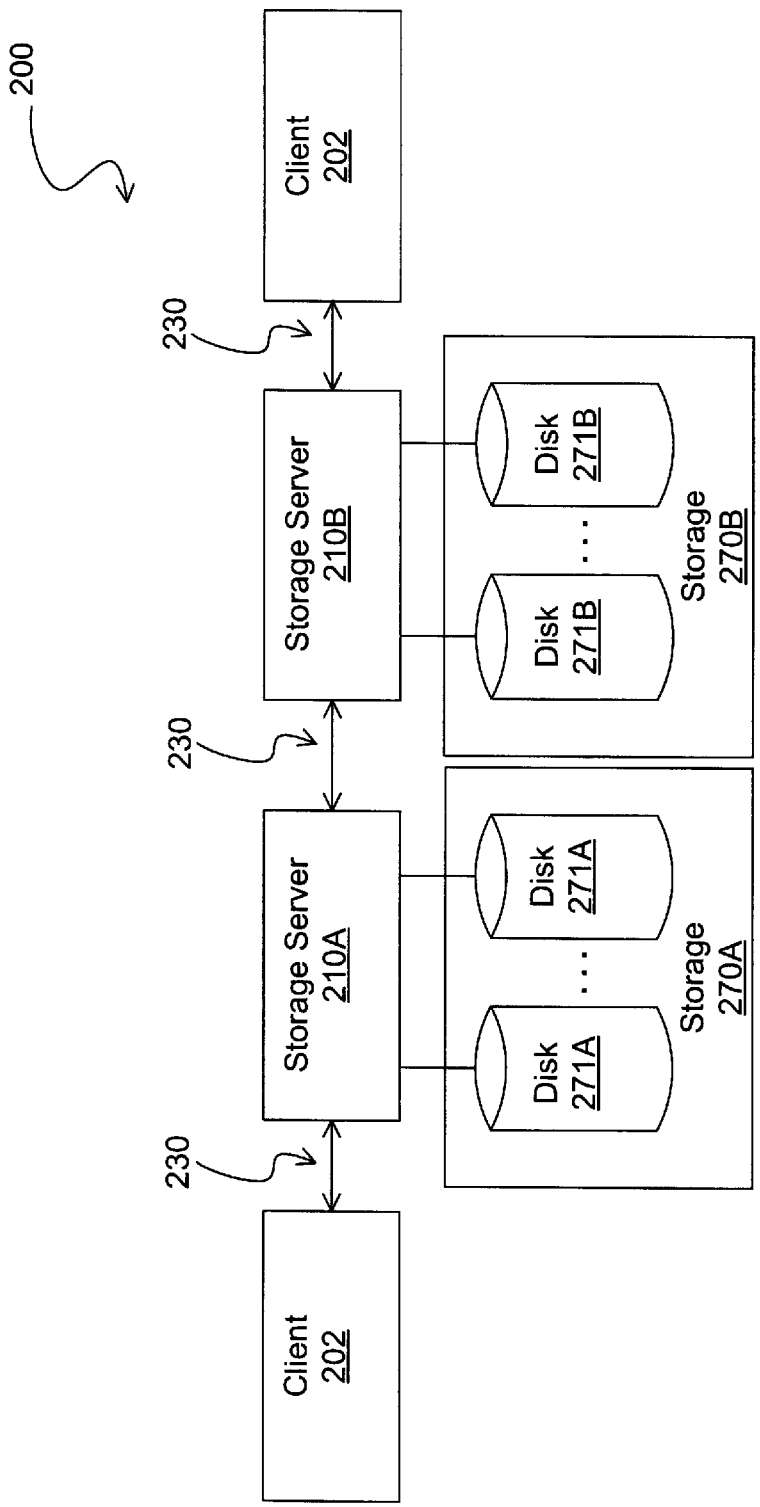
FIG. 2A illustrates a network storage system in which deduplication may be implemented.

FIG. 2A shows a network storage system 200 in which deduplication can be implemented in one embodiment. Storage servers 210 (storage servers 210A, 210B) each manage multiple storage units 270 (storage 270A, 270B) that include mass storage devices. These storage servers provide data storage services to one or more clients 202 through a network 230. Network 230 may be, for example, a local area network (LAN), wide area network (WAN), metropolitan area network (MAN), global area network such as the Internet, a Fibre Channel fabric, or any combination of such interconnects. Each of clients 202 may be, for example, a conventional personal computer (PC), server-class computer, workstation, handheld computing or communication device, or other special or general purpose computer.

Storage of data in storage units 270 is managed by storage servers 210 which receive and respond to various read and write requests from clients 202, directed to data stored in or to be stored in storage units 270. Storage units 270 constitute mass storage devices which can include, for example, flash memory, magnetic or optical disks, or tape drives, illustrated as disks 271 (271A, 271B). The storage devices 271 can further be organized into arrays (not illustrated) implementing a Redundant Array of Inexpensive Disks/Devices (RAID) scheme, whereby storage servers 210 access storage units 270 using one or more RAID protocols known in the art.

Storage servers 210 can provide file-level service such as used in a network-attached storage (NAS) environment, block-level service such as used in a storage area network (SAN) environment, a service which is capable of providing both file-level and block-level service, or any other service capable of providing other data access services. Although storage servers 210 are each illustrated as single units in FIG. 2A, a storage server can, in other embodiments, constitute a separate network element or module (an "N-module") and disk element or module (a "D-module"). In one embodiment, the D-module includes storage access components for servicing client requests. In contrast, the N-module includes functionality that enables client access to storage access components (e.g., the D-module) and may include protocol components, such as Common Internet File System (CIFS), Network File System (NFS), or an Internet Protocol (IP) module, for facilitating such connectivity. Details of a distributed architecture environment involving D-modules and N-modules are described further below with respect to FIG. 2B and embodiments of an D-module and an N-module are described further below with respect to FIG. 4.

In yet other embodiments, storage servers 210 are referred to as network storage subsystems. A network storage subsystem provides networked storage services for a specific application or purpose. Examples of such applications include database applications, web applications, Enterprise Resource Planning (ERP) applications, etc., e.g., implemented in a client. Examples of such purposes include file archiving, backup, minoring, etc., provided, for example, on archive, backup, or secondary storage server connected to a primary storage server. A network storage subsystem can also be implemented with a collection of networked resources provided across multiple storage servers and/or storage units.

In the embodiment of FIG. 2A, one of the storage servers (e.g., storage server 210A) functions as a primary provider of data storage services to client 202. Data storage requests from client 202 are serviced using disks 271A organized as one or more storage objects. A secondary storage server (e.g., storage server 210B) takes a standby role in a mirror relationship with the primary storage server, replicating storage objects from the primary storage server to storage objects organized on disks of the secondary storage server (e.g., disks 270B). In operation, the secondary storage server does not service requests from client 202 until data in the primary storage object becomes inaccessible such as in a disaster with the primary storage server, such event considered a failure at the primary storage server. Upon a failure at the primary storage server, requests from client 202 intended for the primary storage object are serviced using replicated data (i.e. the secondary storage object) at the secondary storage server.

It will be appreciate that in other embodiments, network storage system 200 may include more than two storage servers. In these cases, protection relationships may be operative between various storage servers in system 200 such that one or more primary storage objects from storage server 210A may be replicated to a storage server other than storage server 210B (not shown in this figure). Secondary storage objects may further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 210 should be taken as illustrative only.

Figure 2B:
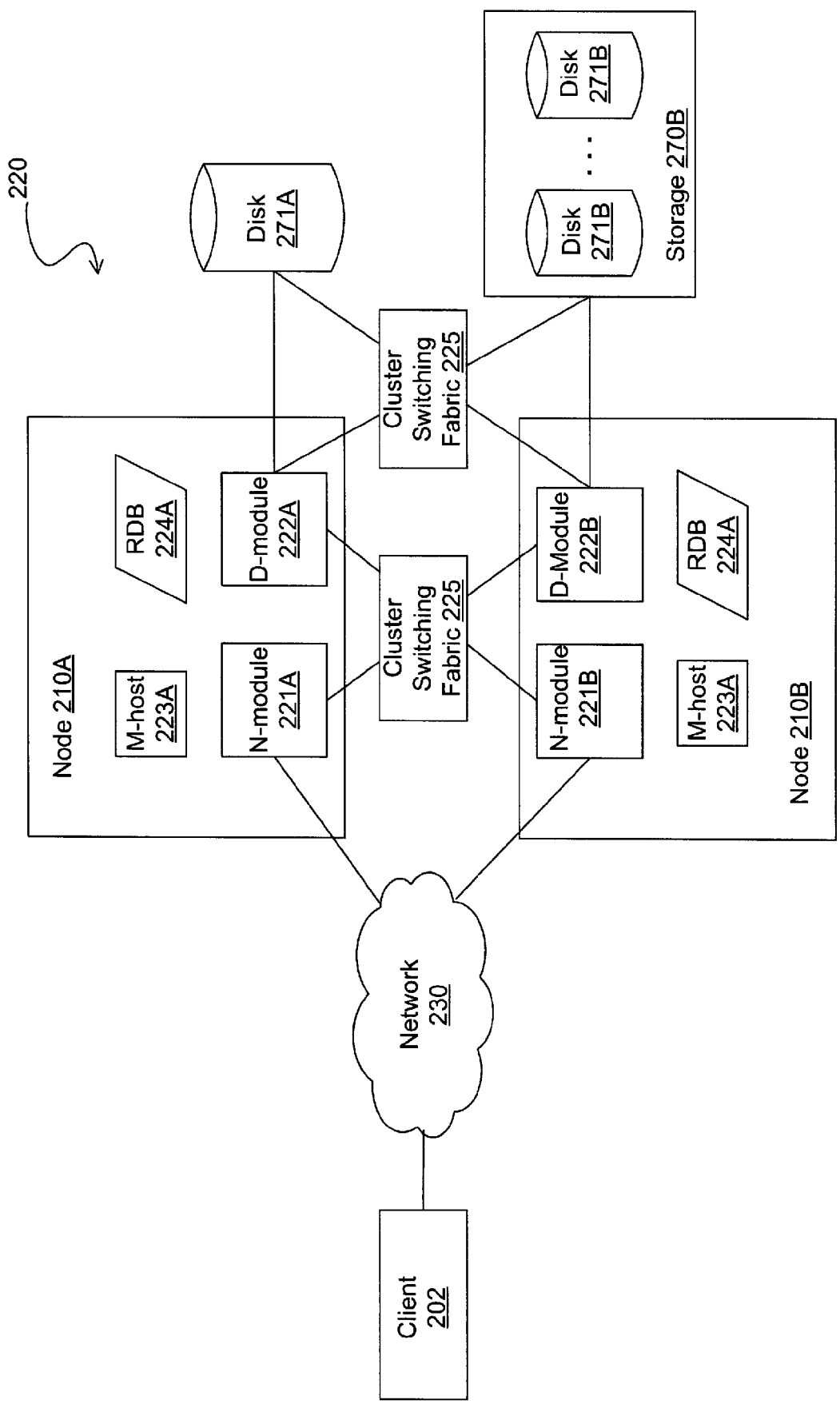
FIG. 2B illustrates a distributed or clustered architecture for a network storage system in which deduplication may be implemented in an alternative embodiment.

FIG. 2B illustrates a block diagram of a distributed or clustered network storage system 220 which may implement rapid cloning in one embodiment. System 220 may include storage servers implemented as nodes 210 (nodes 210A, 210B) which are each configured to provide access to storage devices 271. In FIG. 2B, nodes 210 are interconnected by a cluster switching fabric 225, which may be embodied as an Ethernet switch.

Nodes 210 may be operative as multiple functional components that cooperate to provide a distributed architecture of system 220. To that end, each node 210 may be organized as a network element or module (N-module 221A, 221B), a disk element or module (D-module 222A, 222B), and a management element or module (M-host 223A, 223B). In one embodiment, each module includes a processor and memory for carrying out respective module operations. For example, N-module 221 may include functionality that enables node 210 to connect to client 202 via network 230 and may include protocol components such as a media access layer, Internet Protocol (IP) layer, Transport Control Protocol (TCP) layer, User Datagram Protocol (UDP) layer, and other protocols known in the art.

In contrast, D-module 222 may connect to one or more storage devices 271 via cluster switching fabric 225 and may be operative to service access requests on devices 270. In one embodiment, the D-module 222 implements an extent-based storage architecture 495, as will be described in greater detail below. In one embodiment, the D-module 222 includes storage access components such as a storage abstraction layer supporting multi-protocol data access (e.g., Common Internet File System protocol, the Network File System protocol, and the Hypertext Transfer Protocol), a storage layer implementing storage protocols (e.g., RAID protocol), and a driver layer implementing storage device protocols (e.g., Small Computer Systems Interface protocol) for carrying out operations in support of storage access operations. In the embodiment shown in FIG. 2B, a storage abstraction layer (e.g., file system) of the D-module divides the physical storage of devices 270 into storage objects. Requests received by node 210 (e.g., via N-module 221) may thus include storage object identifiers to indicate a storage object on which to carry out the request.

Also operative in node 210 is M-host 223 which provides cluster services for node 210 by performing operations in support of a distributed storage system image, for instance, across system 220. M-host 223 provides cluster services by managing a data structure such as a RDB 224 (RDB 224A, RDB 224B) which contains information used by N-module 221 to determine which D-module 222 "owns" (services) each storage object. The various instances of RDB 224 across respective nodes 210 may be updated regularly by M-host 223 using conventional protocols operative between each of the M-hosts (e.g., across network 230) to bring them into synchronization with each other. A client request received by N-module 221 may then be routed to the appropriate D-module 222 for servicing to provide a distributed storage system image.

It should be noted that while FIG. 2B shows an equal number of N- and D-modules constituting a node in the illustrative system, there may be different number of N- and D-modules constituting a node in accordance with various embodiments of rapid cloning. For example, there may be a number of N-modules and D-modules of node 210A that does not reflect a one-to-one correspondence between the N- and D-modules of node 210B. As such, the description of a node comprising one N-module and one D-module for each node should be taken as illustrative only.

Moreover, the description of FIGS. 2A-2B is intended to provide an overview of computer hardware and other operating components suitable for performing the methods of the invention described above, but is not intended to limit the applicable environments. One of skill in the art will immediately appreciate that the invention can be practiced with other computer system configurations. The invention can also be practiced in distributed computing environments where tasks are performed by remote processing devices that are linked through a communications network.

It will be readily apparent to one of skill, that input/output devices, such as a keyboard, a pointing device, and a display, may be coupled to the storage server. These conventional features have not been illustrated for sake of clarity.

Figure 3:
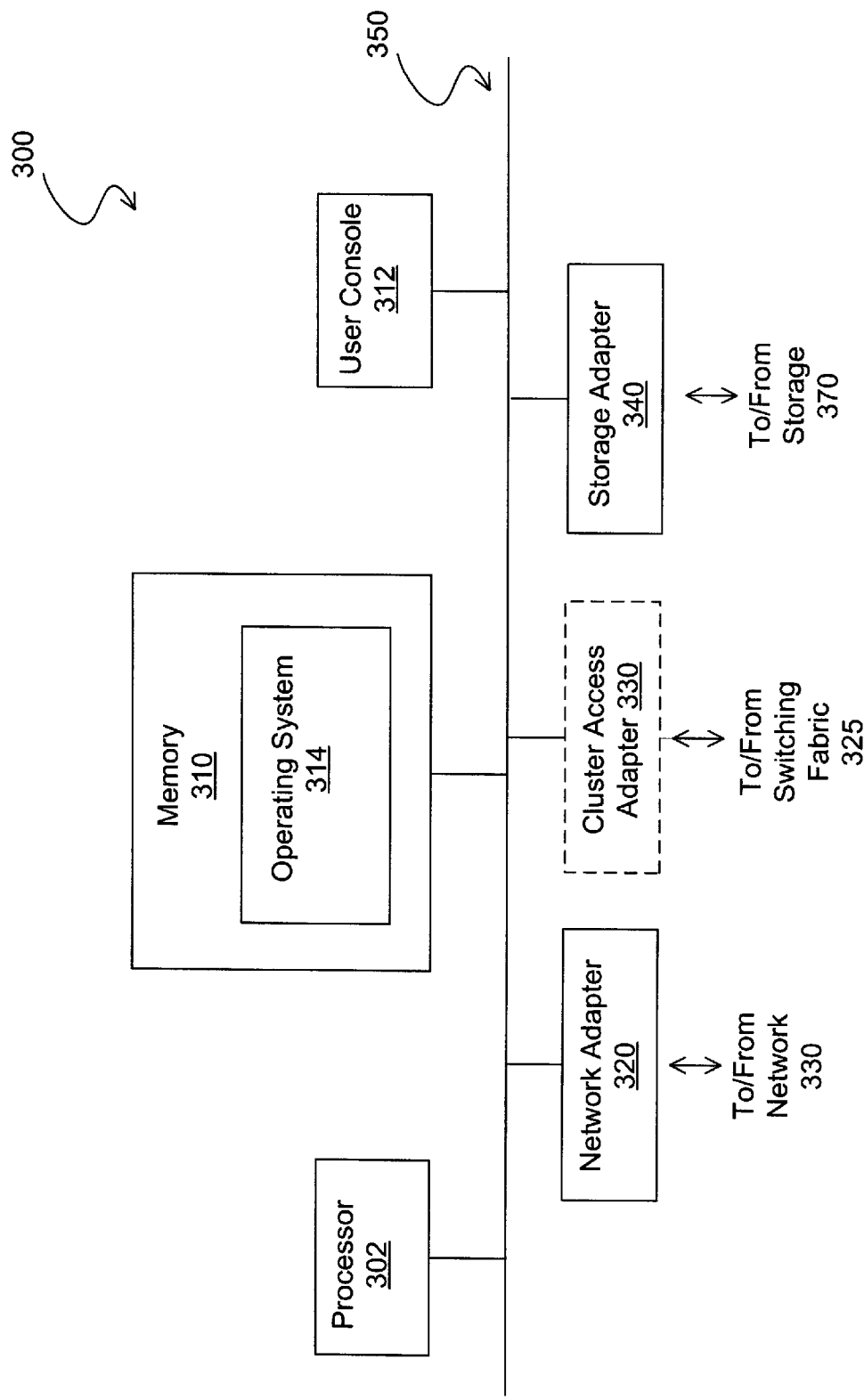
FIG. 3 is a block diagram of an illustrative embodiment of the hardware architecture of a storage server in which deduplication may be implemented.

FIG. 3 is a block diagram of an embodiment of a storage server, such as storage servers 210A and 210B of FIG. 2A, embodied as a general or special purpose computer including a processor 302, a memory 310, a network adapter 320, a user console 312 and a storage adapter 340 interconnected by a system bus 350, such as a convention Peripheral Component Interconnect (PCI) bus.

Memory 310 includes storage locations addressable by processor 302, network adapter 320 and storage adapter 340 for storing processor-executable instructions and data structures associated with rapid cloning. Storage operating system 314, portions of which are typically resident in memory 310 and executed by processor 302, functionally organizes the storage server by invoking operations in support of the storage services provided by the storage server. It will be apparent to those skilled in the art that other processing means may be used for executing instructions and other memory means, including various computer readable media, may be used for storing program instructions pertaining to the inventive techniques described herein. It will also be apparent that some or all of the functionality of the processor 302 and executable software can be implemented by hardware, such as integrated currents configured as programmable logic arrays, ASICs, and the like.

Network adapter 320 comprises one or more ports to couple the storage server to one or more clients over point-to-point links or a network. Thus, network adapter 320 includes the mechanical, electrical and signaling circuitry needed to couple the storage server to one or more client over a network. Each client may communicate with the storage server over the network by exchanging discrete frames or packets of data according to pre-defined protocols, such as TCP/IP.

Storage adapter 340 includes a plurality of ports having input/output (I/O) interface circuitry to couple the storage devices (e.g., disks) to bus 321 over an I/O interconnect arrangement, such as a conventional high-performance, FC or SAS link topology. Storage adapter 340 typically includes a device controller (not illustrated) comprising a processor and a memory for controlling the overall operation of the storage units in accordance with read and write commands received from storage operating system 314. In one embodiment, the storage operating system 314 implements an extent-based storage architecture 495, as will be described in greater detail below. As used herein, data written by a device controller in response to a write command is referred to as "write data," whereas data read by device controller responsive to a read command is referred to as "read data."

User console 312 enables an administrator to interface with the storage server to invoke operations and provide inputs to the storage server using a command line interface (CLI) or a graphical user interface (GUI). In one embodiment, user console 312 is implemented using a monitor and keyboard.

When implemented as a node of a cluster, such as cluster 220 of FIG. 2B, the storage server further includes a cluster access adapter 330 (shown in phantom) having one or more ports to couple the node to other nodes in a cluster. In one embodiment, Ethernet is used as the clustering protocol and interconnect media, although it will apparent to one of skill in the art that other types of protocols and interconnects can by utilized within the cluster architecture.

Figure 4:
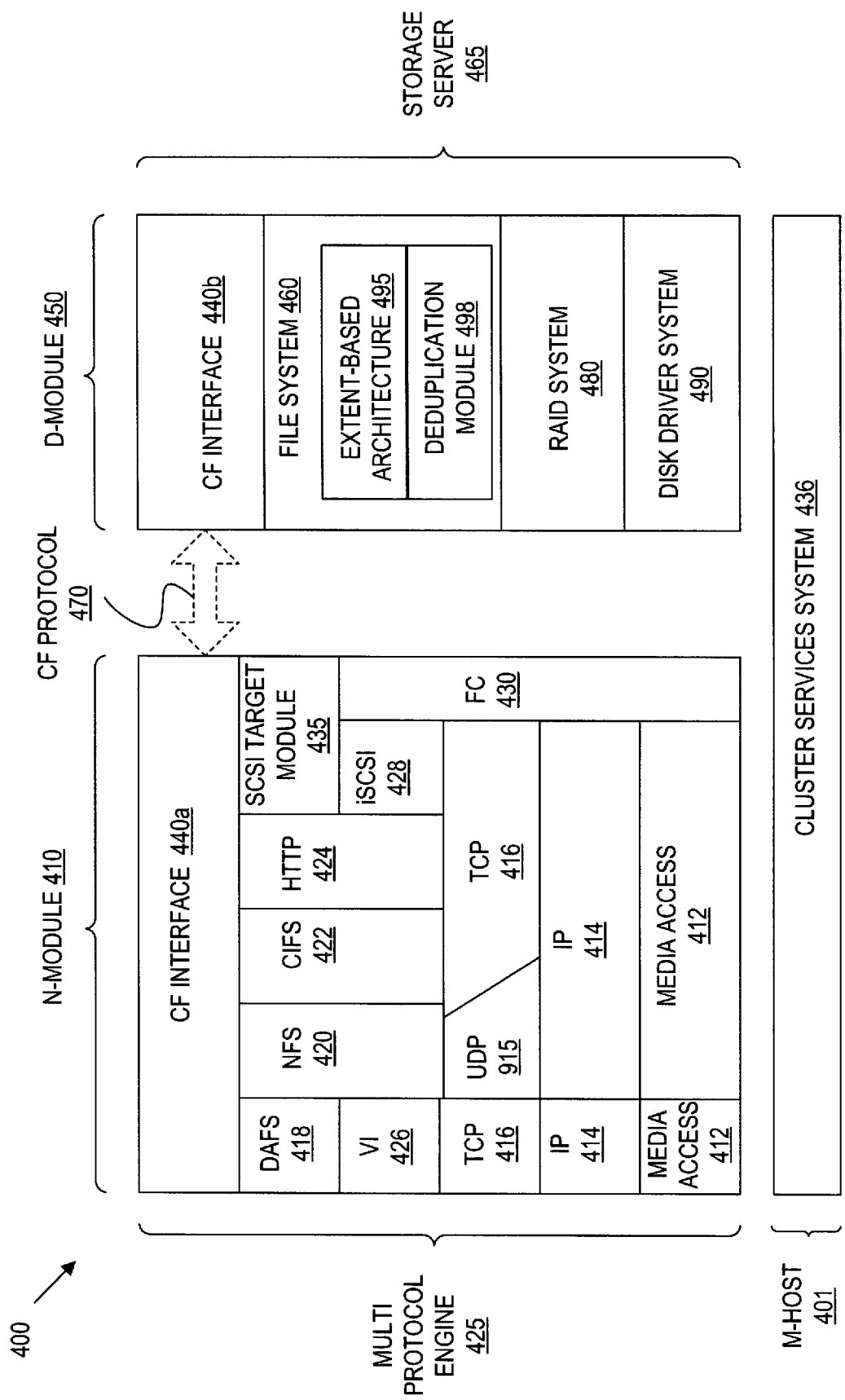
FIG. 4 illustrates an embodiment of the storage operating system of FIG. 3 in which deduplication may be implemented.

FIG. 4 is a block diagram of a storage operating system, such as storage operating system 314 of FIG. 3, that implements an embodiment of deduplication. The storage operating system comprises a series of software layers executed by a processor, such as processor 302 of FIG. 3, and organized to form an integrated network protocol stack or, more generally, a multi-protocol engine 425 that provides data paths for clients to access information stored on the storage server using block and file access protocols.

Multi-protocol engine 425 includes a media access layer 412 of network drivers (e.g., gigabit Ethernet drivers) that interface with network protocol layers, such as the IP layer 414 and its supporting transport mechanisms, the TCP layer 416 and the User Datagram Protocol (UDP) layer 415. A file system protocol layer provides multi-protocol file access and, to that end, includes support for the Direct Access File System (DAFS) protocol 418, the NFS protocol 420, the CIFS protocol 422 and the Hypertext Transfer Protocol (HTTP) protocol 424. A VI layer 426 implements the VI architecture to provide direct access transport (DAT) capabilities, such as RDMA, as required by the DAFS protocol 418. An iSCSI driver layer 428 provides block protocol access over the TCP/IP network protocol layers, while a FC driver layer 430 receives and transmits block access requests and responses to and from the storage server. In certain cases, a Fibre Channel over Ethernet (FCoE) layer (not shown) may also be operative in multi-protocol engine 425 to receive and transmit requests and responses to and from the storage server. The FC and iSCSI drivers provide respective FC- and iSCSI-specific access control to the blocks and, thus, manage exports of luns to either iSCSI or FCP or, alternatively, to both iSCSI and FCP when accessing blocks on the storage server.

The storage operating system also includes a series of software layers organized to form a storage server 465 that provides data paths for accessing information stored on storage devices. Information may include data received from a client, in addition to data accessed by the storage operating system in support of storage server operations such as program application data or other system data. Preferably, client data may be organized as one or more logical storage objects (e.g., volumes) that comprise a collection of storage devices cooperating to define an overall logical arrangement. In one embodiment, the logical arrangement may involve logical volume block number (vbn) spaces, wherein each volume is associated with a unique vbn.

The file system 460 implements a virtualization system of the storage operating system through the interaction with one or more virtualization modules (illustrated as a SCSI target module 435). The SCSI target module 435 is generally disposed between drivers 428, 430 and the file system 460 to provide a translation layer between the block (lun) space and the file system space, where luns are represented as blocks. In one embodiment, the file system 460 implements a WAFL (write anywhere file layout) file system having an on-disk format representation that is block-based using, e.g., 4 kilobyte (KB) blocks and using a data structure such as index nodes ("inodes") to identify files and file attributes (such as creation time, access permissions, size and block location). File system 460 uses files to store metadata describing the layout of its file system, including an inode file, which directly or indirectly references (points to) the underlying data blocks of a file.

For one embodiment, the file system 460 includes an extent-based architecture 495 as an extension to WAFL. Operationally, a request from a client is forwarded as a packet over the network and onto the storage server where it is received at a network adapter. A network driver such as layer 412 or layer 430 processes the packet and, if appropriate, passes it on to a network protocol and file access layer for additional processing prior to forwarding to file system 460. There, file system 460 generates operations to load (retrieve) the requested data from the disks if it is not resident "in core", i.e., in memory 310. If the information is not in memory, file system 460, in cooperation with the extent-based architecture 495, accesses an indirect volume to retrieve an extent identifier, accesses an extent-to-physical block data structure to retrieve a PVBN and passes the PVBN to the RAID system 480. In one embodiment, the extent-to-physical block data structure is implemented as a map. There, the PVBN is mapped to a disk identifier and device block number (disk, DBN) and sent to an appropriate driver of disk driver system 490. The disk driver accesses the DBN from the specified disk and loads the requested data block(s) in memory for processing by the storage server. Upon completion of the request, the node (and operating system 400) returns a reply to the client over the network.

It should be noted that the software "path" through the storage operating system layers described above needed to perform data storage access for the client request received at the storage server adaptable to the teachings of the invention may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by the storage server in response to a request issued by a client. Moreover, in another alternate embodiment of the invention, the processing elements of adapters 320, 340 may be configured to offload some or all of the packet processing and storage access operations, respectively, from processor 302, to thereby increase the performance of the storage service provided by the storage server. It is expressly contemplated that the various processes, architectures and procedures described herein can be implemented in hardware, firmware or software.

When implemented in a cluster, data access components of the storage operating system may be embodied as D-module 450 for accessing data stored on disk. In contrast, multi-protocol engine 425 may be embodied as N-module 410 to perform protocol termination with respect to a client issuing incoming access over the network, as well as to redirect the access requests to any other N-module in the cluster. A cluster services system 436 may further implement an M-host (e.g., M-host 401) to provide cluster services for generating information sharing operations to present a distributed file system image for the cluster. For instance, media access layer 412 may send and receive information packets between the various cluster services systems of the nodes to synchronize the replicated databases in each of the nodes.

In addition, a cluster fabric (CF) interface module 440 (CF interface modules 440A, 440B) may facilitate intra-cluster communication between N-module 410 and D-module 450 using a CF protocol 470. For instance, D-module 450 may expose a CF application programming interface (API) to which N-module 410 (or another D-module not shown) issues calls. To that end, CF interface module 440 can be organized as a CF encoder/decoder using local procedure calls (LPCs) and remote procedure calls (RPCs) to communicate a file system command to between D-modules residing on the same node and remote nodes, respectively.

Deduplication in an extent-based architecture requires receiving a request to deduplicate, deduplicating a physical volume associated with the request, and deduplicating one or more extents associated with the deduplicated physical volume, and may be performed by deduplication module 498 in file system 460.

Although the present invention is shown herein to implement deduplication within the storage operating system, it will be appreciated that deduplication may be implemented in other modules or components of the storage server in other embodiments. In addition, deduplication may be implemented as one or a combination of a software-executing processor, hardware or firmware within the storage server. As such, deduplication may directly or indirectly interface with modules of the storage operating system in accordance with teachings of the present invention.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including conventional write in place file systems.

Figure 5:
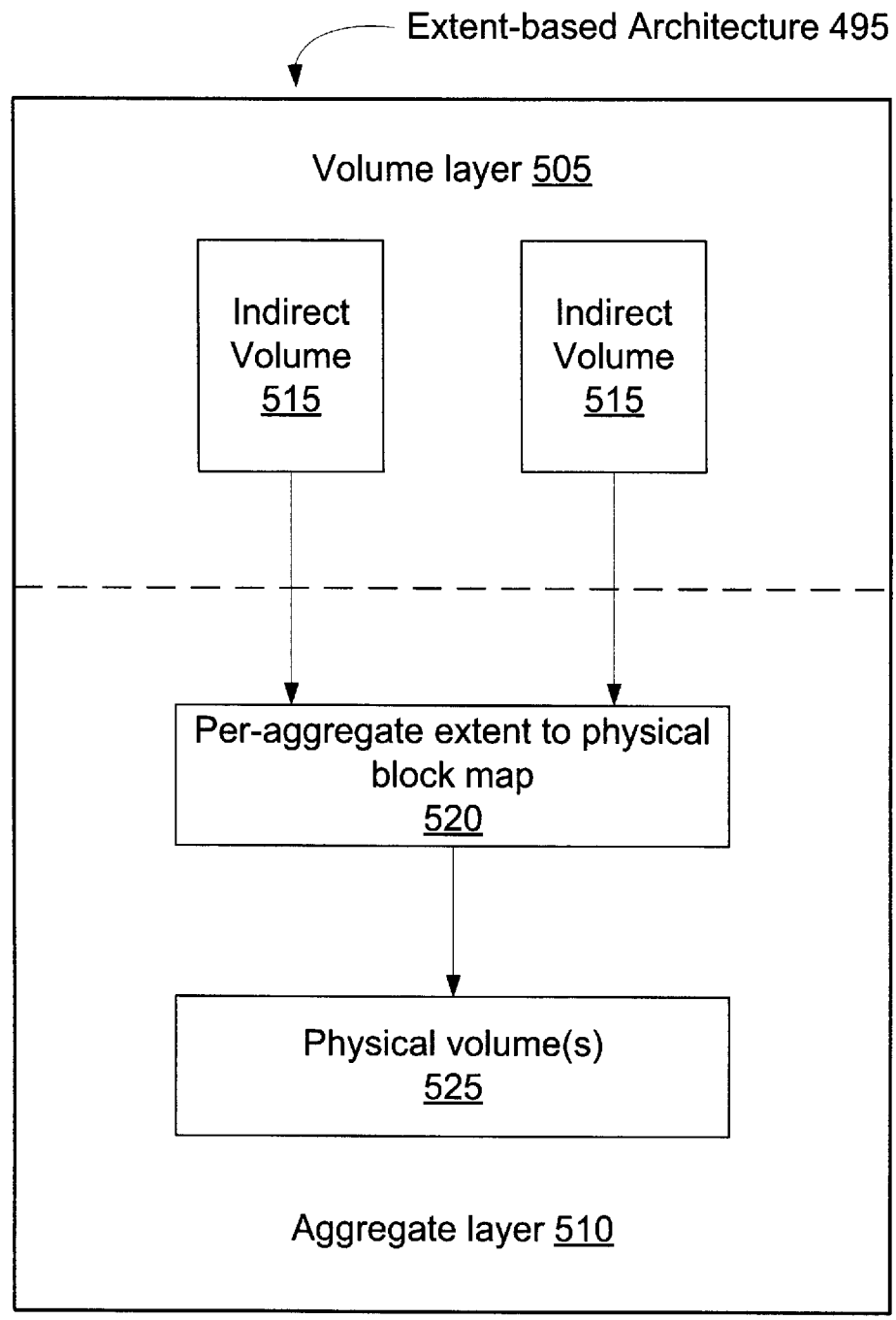
FIG. 5 illustrates an exemplary block diagram of an extent-based storage architecture.

FIG. 5 illustrates an exemplary block diagram of an extent-based architecture 495. The extent-based architecture 495 includes a volume layer 505 and an aggregate or region manager layer 510. The volume layer 505 includes one or more indirect volumes 515 to indirectly map an I/O request from a client 202 to one or more physical blocks within the storage disks 271. For one embodiment, the storage server 210 uses one entry in the indirect volumes 515 for each extent, as opposed to prior art block-based implementations that used one indirect volume entry (e.g., in a flexible volume 110) for each data block. For one embodiment, the I/O request references data by way of a file block number (FBN). A FBN refers to a data block in an indirect volume 515 as seen by a client 202. The FBN is used as a key to access an extent identifier. An extent, as used herein, refers to a contiguous group of one or more blocks in an FBN space. An extent-to-physical block map, as used herein, is a data structure which is implemented as a map in one embodiment. The aggregate layer 510 includes an extent-to-physical block map 520 and one or more physical volumes 525. The extent-to-physical block map 520 maps an extent identifier (e.g., accessed by way of an FBN in the volume layer 505) to a pointer to another extent or to one or more physical volume block numbers (PVBN) in the physical volume 525. A PVBN, as used herein, refers to disk blocks that have been abstracted into a single linear sequence.

The extent-based entries of the extent-to-physical block map 520 provide per-aggregate indirection. In contrast, virtual volume block numbers (VVBN) of volume containers 120 provide per-volume indirection. A per-aggregate extent-based entry, as used herein, refers to an extent being unique across volume boundaries within an aggregate. A per-volume indirect entry refers to an entry being unique within volume boundaries. For per-aggregate indirection, when the storage server 210 copies, moves, or makes other changes to physical blocks, the changes are reflected within the aggregate layer 510 in the extent-to-physical block map 520. These changes, however, do not need to be propagated into the volume layer 505 because the extent identifier associated with the physical block does not need to change. This enables compression, decompression, sharing, and unsharing of extents to occur without communication with the volume layer 505. Blocks can be easily shared across volume boundaries, enabling cross-volume deduplication. Segment cleaning and related disk gardening techniques can be performed on the extent-to-physical block map 520 in a single pass, all without having to propagate changes up into the volume layer 505.

Figure 6:
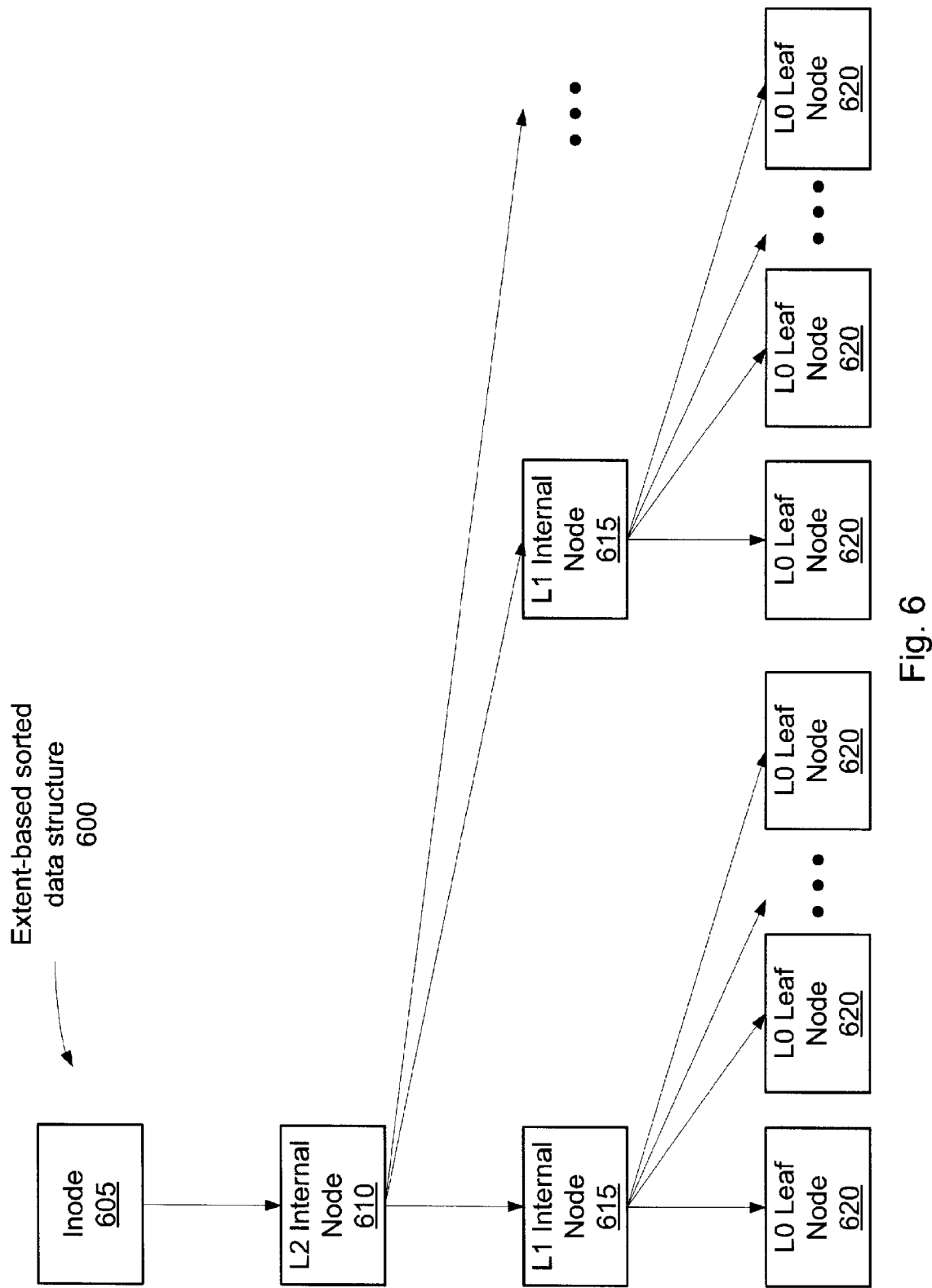
FIG. 6 illustrates an exemplary extent-based sorted data structure within an extent-based storage architecture.

FIG. 6 shows an exemplary extent-based sorted data structure 600 within an extent-based storage architecture, such as extent-based architecture 495. For one embodiment, the extent-based sorted data structure 600 is a B+ tree. Alternatively, the extent-based sorted data structure 600 is another type of tree or sorted data structure that is able to perform lookup and modify operations in, at most, O(log n) time, where n is the number of blocks in a file. An inode 605 points to the root of the extent-based tree/sorted data structure 600 and contains volume/file metadata and pointers to data blocks 620 or indirect blocks 610/615. For example, in a B+ tree, indirect blocks are referred to as internal nodes 610/615 and data blocks are referred to as leaf nodes 620. For one embodiment, the inode 605 points to one or more branches of internal nodes 610/615. For an alternate embodiment, the inode 605 points directly to the leaf nodes 620. For one embodiment, the internal nodes 610/615 store pointers to other nodes but do not store data, e.g. data such as an FBN, extent identifier, PVBN, etc. The leaf nodes 620, on the other hand, store such data. For another embodiment, the internal nodes 610/615 may store data.

For one embodiment, the length of extents may be pre-defined (e.g., 8 blocks). For an alternate embodiment, the length of extents may vary. For one embodiment, the length of an extent is expressed as the number of blocks within the extent. For example, an extent containing only a single block would have a length of 1, an extent containing two blocks would have a length of 2, etc. For one embodiment, extents have a maximum length driven by user I/O or write allocation (e.g., extents having a maximum length of 64 blocks).

For an embodiment utilizing an extent-based tree with variable-length extents as the data structure of extent-based data structure 600, the height of the tree is variable, even between two files of the same size. For one embodiment, the span of an internal node 610/615 is also variable. As used herein, the span of an indirect block refers to the number of blocks to which that indirect block refers. As a comparison, in previous implementations of WAFL, the span of an indirect block is fixed: the span of a tradvol indirect block is 1024, the span of a flexvol indirect block (e.g., as stored in flexible volume 11) is 510, and the span of a 32-bit flexvol indirect block (e.g., as stored in flexible volume 11) is 255.

Additionally, in the previous implementations of WAFL, a contiguous extent containing N blocks would use the same amount of indirect space as N randomly located blocks because each data block of the extent would be represented by a separate indirect entry in the volume layer. An extent-based sorted data structure 600, however, greatly reduces the amount of indirect space used because volume layer entries are per-extent rather than per-block. For example, consider a 64-bit flexvol storing a file containing 532,685,800 bytes of data (approximately 508 MB) as implemented in previous implementations of WAFL. The flexvol includes indirect blocks having 255 entries (a span of 255) and each entry refers to a 4 KB block. The flexvol represents the 508 MB file using two level-2 indirect blocks pointing to 510 level 1 indirect blocks pointing to 130050 4 KB level 0 data blocks. In an extent-based sorted data structure 600, instead of using one entry for each 4 KB block, the storage server 210 uses one entry for each extent. Extents can be longer than a single 4 KB block. For example, an extent is a contiguous group of one or more 4 KB blocks. Using an extent-based sorted data structure 600 with 16 block long extents and 127 entries per block, the storage server 210 represents the 130050 4 KB with only 8129 leaf nodes 620 and 65 internal nodes 610/615, resulting in an 87% savings in indirect block metadata.

Figure 7:
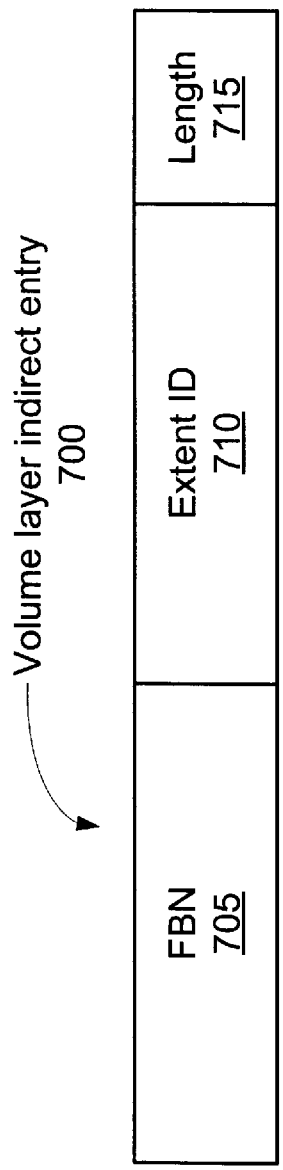
FIG. 7 illustrates an exemplary volume layer indirect entry for a leaf node of the extent-based data structure of FIG. 6 when used to implement an indirect volume.

For one embodiment, the storage server 210 uses an extent-based sorted data structure 600 to implement an indirect volume 515. For one embodiment, the storage server 210 implements each indirect volume 515 as a B+ tree. FIG. 7 shows an exemplary volume layer indirect entry 700 for a leaf node 620 of an extent-based sorted data structure 600 used to implement an indirect volume 515. The volume layer indirect entry 700 stores a FBN 705, a corresponding extent identifier 710, and a length of the extent 715. The storage server 210 uses the FBN 705 as the primary sorting key to navigate the extent-based sorted data structure 600 and find the extent identifier 710 that corresponds to the FBN 705. For one embodiment, the FBN 705 is 48 bits, the extent identifier 710 is 48 bits, and the length 715 is 8 bits. Alternatively, the storage server 210 uses different sizes for one or more of the FBN 705, extent identifier 710, or length 715. For example, the extent identifier 710 may be 64 bits long in an alternate embodiment (e.g., to provide for 512 byte granularity in the offset of blocks). For one embodiment, the extent length 715 varies. For an alternate embodiment, the extent length 715 is fixed.

Extent identifiers 710 are allocated during a write allocation. For one embodiment, the storage server 210 allocates extent identifiers 710 from a finite pool of extent identifiers. Alternatively, extent identifiers 710 are monotonically increasing values that never wrap.

The per-volume container files 120 of previous implementations of WAFL are not used in an extent-based sorted data structure 600 used to implement an indirect volume 515. Instead of per-volume container files 120, the storage server 210 uses an extent-to-physical block map. As described above, the use of the extent-to-physical block map can result in reduced indirect metadata. The indirect volume blocks, however, no longer contain cached pointers to PVBN's. Accesses to an extent involves the storage server 210 looking up an extent identifier 710 in the indirect volume 515 and looking up the PVBN (e.g., by way of a pointer) in the extent-to-physical block map 520. The computational overhead of this additional 110 look-up is offset by some of the features of extent-based architecture 495. For example, I/O accesses are per extent rather than per block and, therefore, multiple blocks are accessed by a single I/O access. Additionally, the extent-based architecture 495 gains advantages in compression, deduplication, segment cleaning, etc. Actions such as deduplication can easily span the aggregate rather than just a single volume and many changes to blocks, e.g., resulting from compression and segment cleaning, do not need to be propagated up to the indirect volume 515 (e.g., to correct cached indirect pointers).

Figure 8:
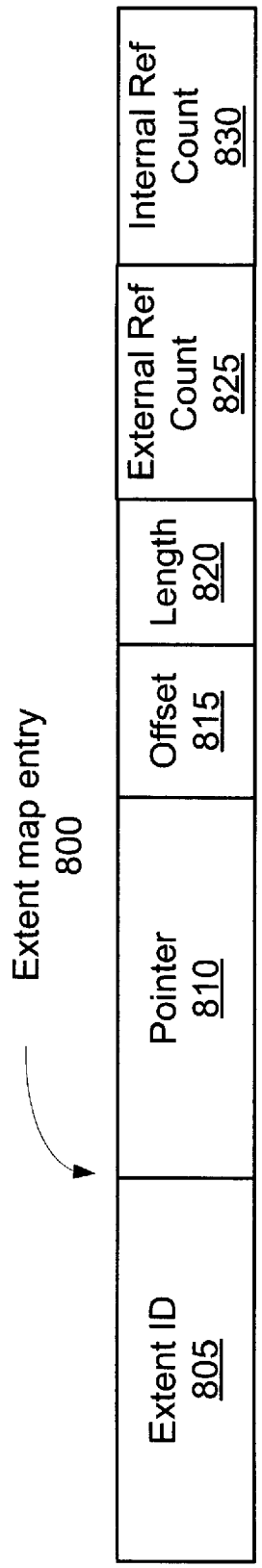
FIG. 8 illustrates an exemplary extent map entry for a leaf node of the extent-based data structure of FIG. 6 when used to implement an extent-to-physical block map.

For one embodiment, the storage server 210 uses an extent-based tree as an extent-based sorted data structure 600 to implement an extent-to-physical block map 520. For one embodiment, the storage server 210 implements an extent-to-physical block map 520 as a B+ tree. FIG. 8 shows an exemplary extent map entry 800 for a leaf node 620 of an extent-based sorted data structure 600 used to implement an extent-to-physical block map 520. Leaf nodes 620 of an extent-based sorted data structure 600 used to implement an extent-to-physical block map 520 store extent identifiers 805, one or more pointers to PVBN's or another extent identifier 810, offsets for the extents 815, and lengths for the extents 820. For one embodiment, the extent identifier 805 is 48 bits, the pointer/extent identifier 810 is 48 bits, the offset 815 is 8 bits, and the length 820 is 8 bits.

For one embodiment, each extent map entry 800 includes either a pointer or other reference 810 directly to a PVBN or to another extent identifier 805 that directly references a PVBN. Additionally, each PVBN is owned by only one extent and any other extent that references the PVBN does so by way of referencing the owner extent. In one embodiment, the owner extent is the extent that directly references the PVBN. As a result, the maximum additional look-up for a given extent to get to a PVBN should be no more than one. This maximum prevents the level of indirect references in extent map entries 800 from becoming arbitrarily deep (large) and taking an arbitrary amount of time (as measured in terms of disk I/O operations, assuming that each extent entry is likely to be stored within a different disk block). As used herein, deep refers to a number of levels of indirect references.

As a result, the storage server 210 uses the owner extent identifier as a tag, unique number, or other context for the purpose of lost write detection. As used herein, lost write detection refers to the detection of writes that storage server 210 reports have been completed even though storage server 210 has actually failed to write data to an I/O persistent storage (e.g., storage 270A, storage 270B, etc.).

For an alternate embodiment, all extent identifiers 805 map directly to a PVBN and PVBNs can be owned by more than one extent. For an embodiment including lost write detection, the storage server 210 creates a context, tag, or unique number, e.g., via a separate table, that is separate/different from the extent identifiers 805 due to the possibility of multiple extent identifiers referencing a single PVBN.

For one embodiment, the storage server 210 maintains, e.g., in one or more metafiles, reference counts for references by extents to each extent and by extents to each PVBN. Reference counts enable the storage server 210 to be aware of whether or not other extents would be affected by operations performed on an extent/PVBN (e.g., reallocation, segment cleaning, etc.). In one embodiment, an extent is affected by operations performed on the extent when an operation performed on the extent changes one or more values stored within the extent. The storage server 210 tracks increments and decrements of the reference count in one or more log data containers. For example, the storage server 210 would increment a reference count when a new extent/PVBN is allocated, when an extent identifier is shared (e.g., via clone creation, snapshot creation, or deduplication), etc. For one embodiment, the storage server 210 accumulates, increments and decrements using a log data container, and makes batch updates to reference count metafiles, e.g., at a consistency point.

An external reference count 825 is maintained as a reference count on an extent that is generated from outside (e.g., external to) the extent-to-physical block map 520. A single external reference count 825 is used for each extent. For example, an external reference count for an extent is set to one when a new extent is allocated (e.g., during file creation or modification). For one embodiment, the storage server 210 increments the external reference count 825 from zero to one for a PVBN directly (bypassing the log data container) when allocating a new extent/PVBN. An external extent is an extent in the extent-to-physical block map 520 that contains at least one external reference. In one example, if the external reference count for an extent is non-zero, the external extent cannot be freed by a deduplication operation.

Internal reference count 830 is maintained for an extent map entry 800. Internal reference count 830 includes an internal reference count for each PBVN inside of extent map entry 800. Each internal reference count is generated by an internal operation of the extent-to-physical block map 520. An internal extent is an extent in the extent-to-physical block map 520 that contains a predetermined number of external references (e.g., external reference count is zero). In one embodiment, the storage server 210 executes all increments and decrements of the reference counts via the respective reference count log data container in all cases other than allocating a new extent/PBVN (e.g., modifying PBVN, overwriting PBVN, etc.).

Figure 9:
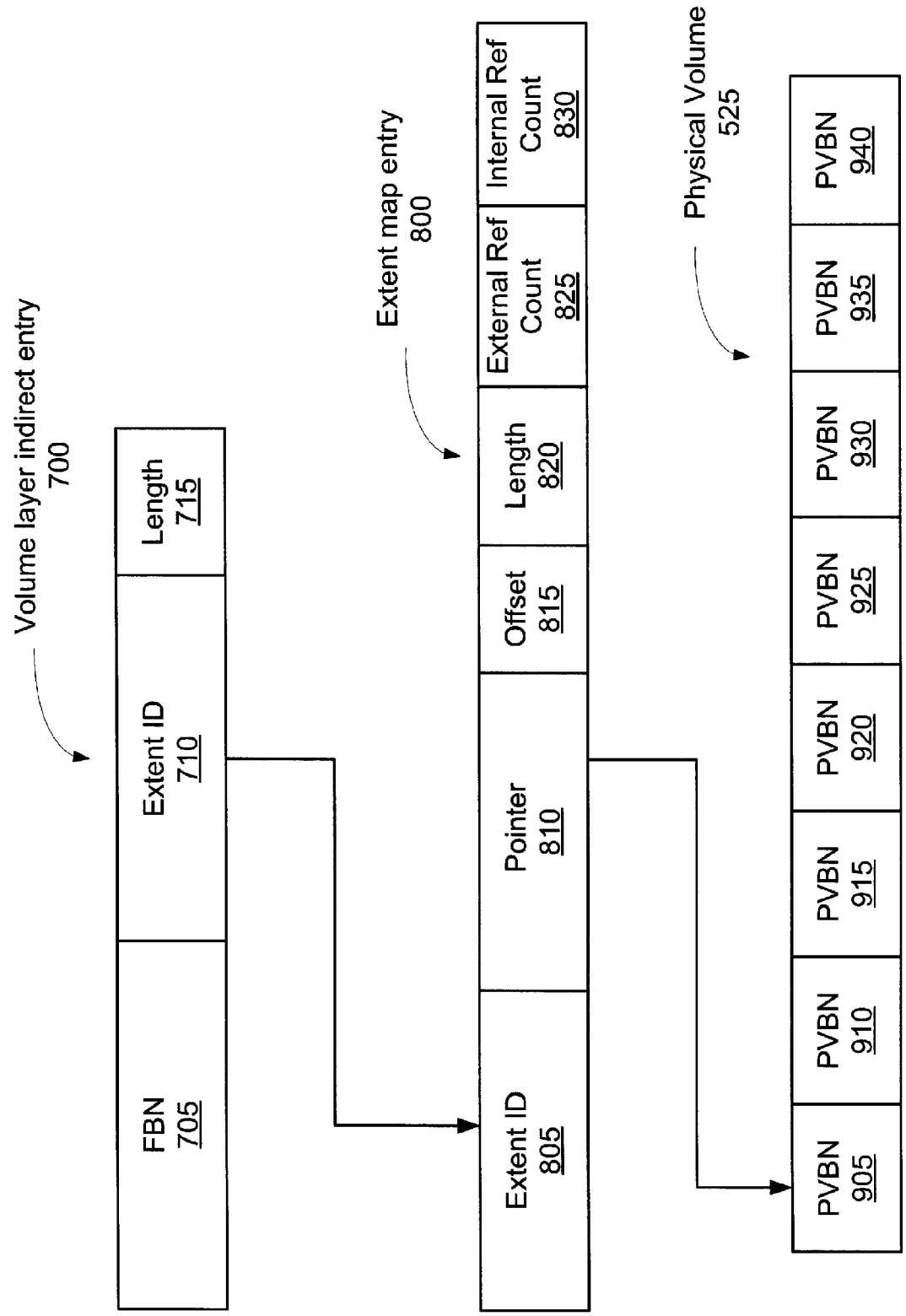
FIG. 9 illustrates an exemplary sequence of look ups in the volume layer and aggregate layer of an extent-based storage architecture to map an FBN to a PVBN.

FIG. 9 shows an exemplary sequence of look ups in the volume layer 505 and aggregate layer 510 to map an FBN to a PVBN in physical volume 525. For example, when the storage server 210 receives an I/O request including an FBN 705, the storage server 210 uses the FBN as a key in an indirect volume 515 to look up an extent identifier 710 in a volume layer indirect entry 700. The storage server 210 uses the extent identifier 710 as a key to look up an extent map entry 800 in an extent-to-physical block map 520. The storage server 210 uses the pointer 810 to access PVBN 905 in the physical volume 525. In this example, the offset 815 is zero. If the offset was a positive value, the storage server 210 would access one or more blocks subsequent to PVBN 905 (e.g., PVBN 915, PVBN 925, etc). If the length 820 is greater than 1, the storage server 210 would access PVBN 905 and one or more subsequent blocks (e.g., PVBN 915, PVBN 925, etc.). In this example, the external reference count 825 is non-zero (e.g., one) because the extent map entry 800 is identified in a volume layer indirect entry 700, and the extent is therefore an external extent. In this example, the extent map entry 800 is not an internal extent, as the extent is referenced by the volume layer indirect entry 700.

Figure 10:
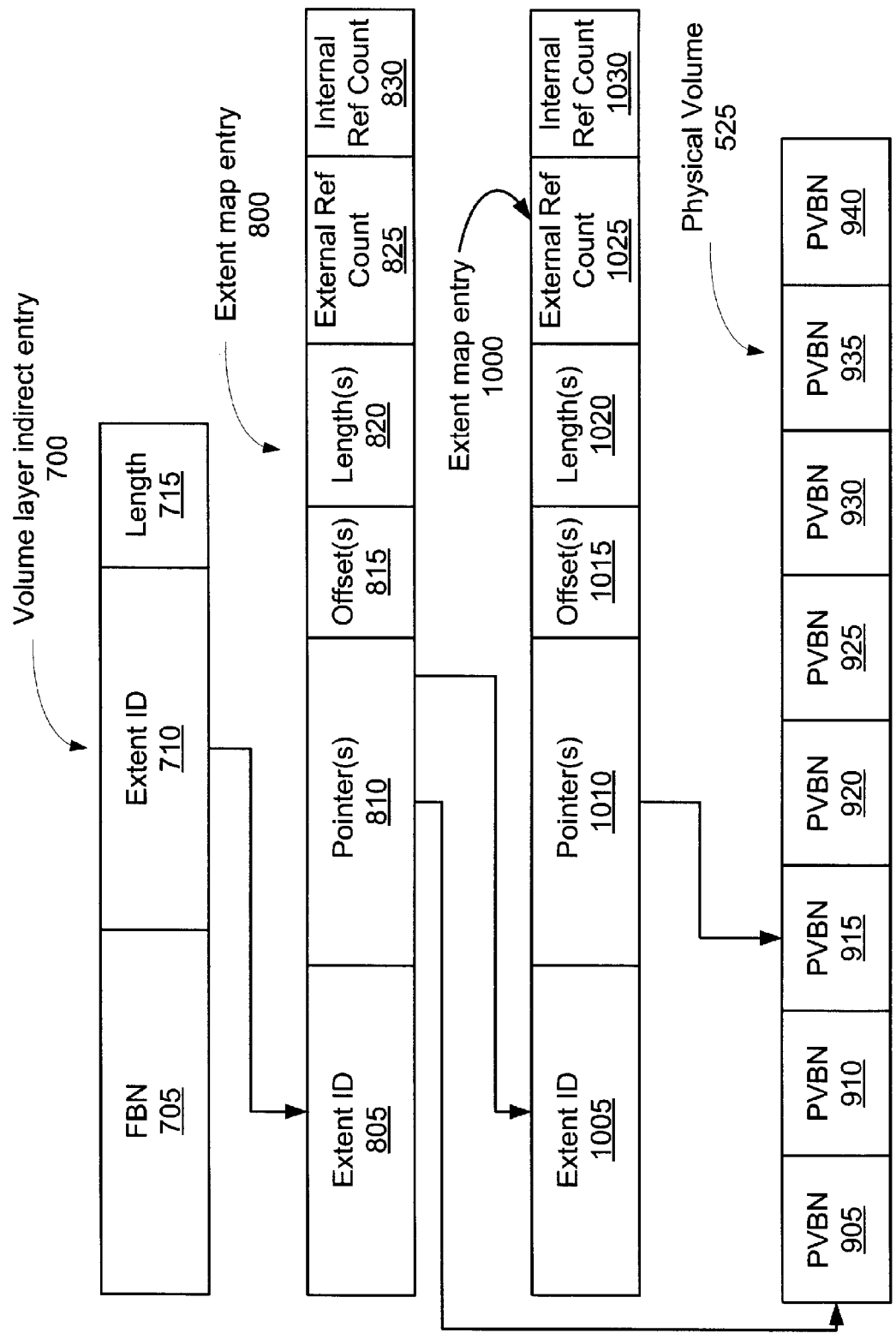
FIG. 10 illustrates another exemplary sequence of look ups in the volume layer and aggregate layer of an extent-based storage architecture to map an FBN to a PVBN.

FIG. 10 shows another exemplary sequence of look ups in the volume layer 505 and aggregate layer 510 to map an FBN to a PVBN in physical volume 525. Similar to the example described with reference to FIG. 9, the storage server 210 receives an I/O request including an FBN 705 and uses the FBN as a key in an indirect volume 515 to look up an extent identifier 710 in a volume layer indirect entry 700. The storage server 210 uses the extent identifier 710 as a key to look up a first extent map entry 800 in an extent-to-physical block map 520. In this example, the first extent map entry 800 includes a pointer 810 to a PVBN 905 and a pointer or extent identifier 810 to a second extent map entry 1000. The first extent map entry 800 can be referred to as an external extent. An external extent is an extent which is referenced by the active file system, volume clone, or a snapshot. The storage server 210 uses the pointer 810 to access PVBN 905 in the physical volume 525. The storage server 210 uses the extent identifier 810 to look up the second extent map entry 1000 in the extent-to-physical block map 520. The storage server 210 uses the pointer 1010 to access PVBN 915 in the physical volume 525. In this example, the external reference count 825 is non-zero (e.g., one) because the extent map entry 800 is identified in a volume layer indirect entry 700, and the extent is therefore an external extent. In this example, the extent map entry 800 is not an internal extent, as the extent is referenced by the volume layer indirect entry 700. The extent map entry 1000 can be referred to as an internal extent. An internal extent is referenced only by other extents and only holds the PBVN which is referenced by the first extent map entry 800. In this example, the external reference count 1025 is a predetermined number (e.g., zero) indicating that the extent map entry 1000 is referenced only by the external extent map entry 800.

Figure 11:
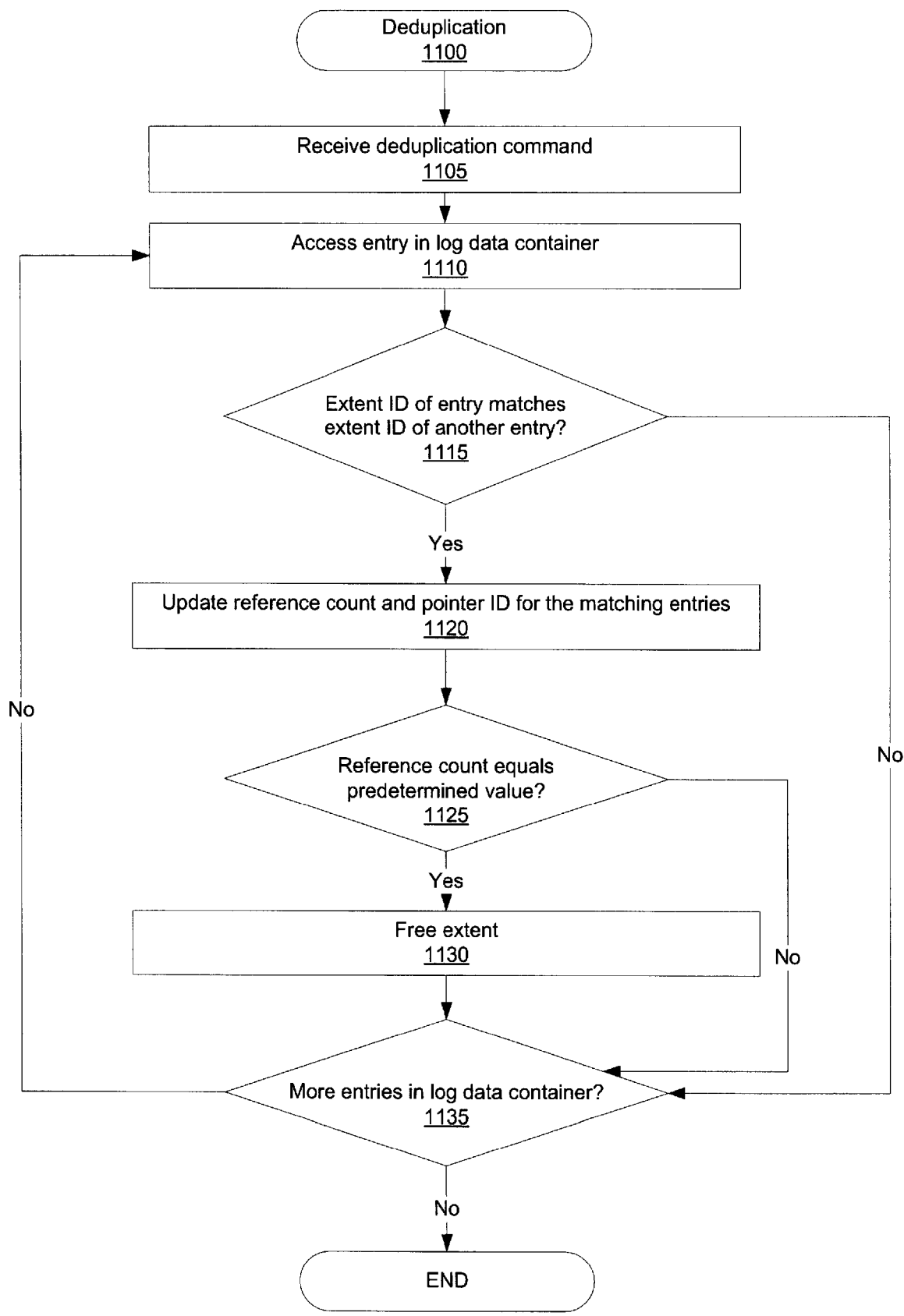
FIG. 11 illustrates a flow diagram of a deduplication in an extent-based architecture method according to an embodiment.
Figure 12:
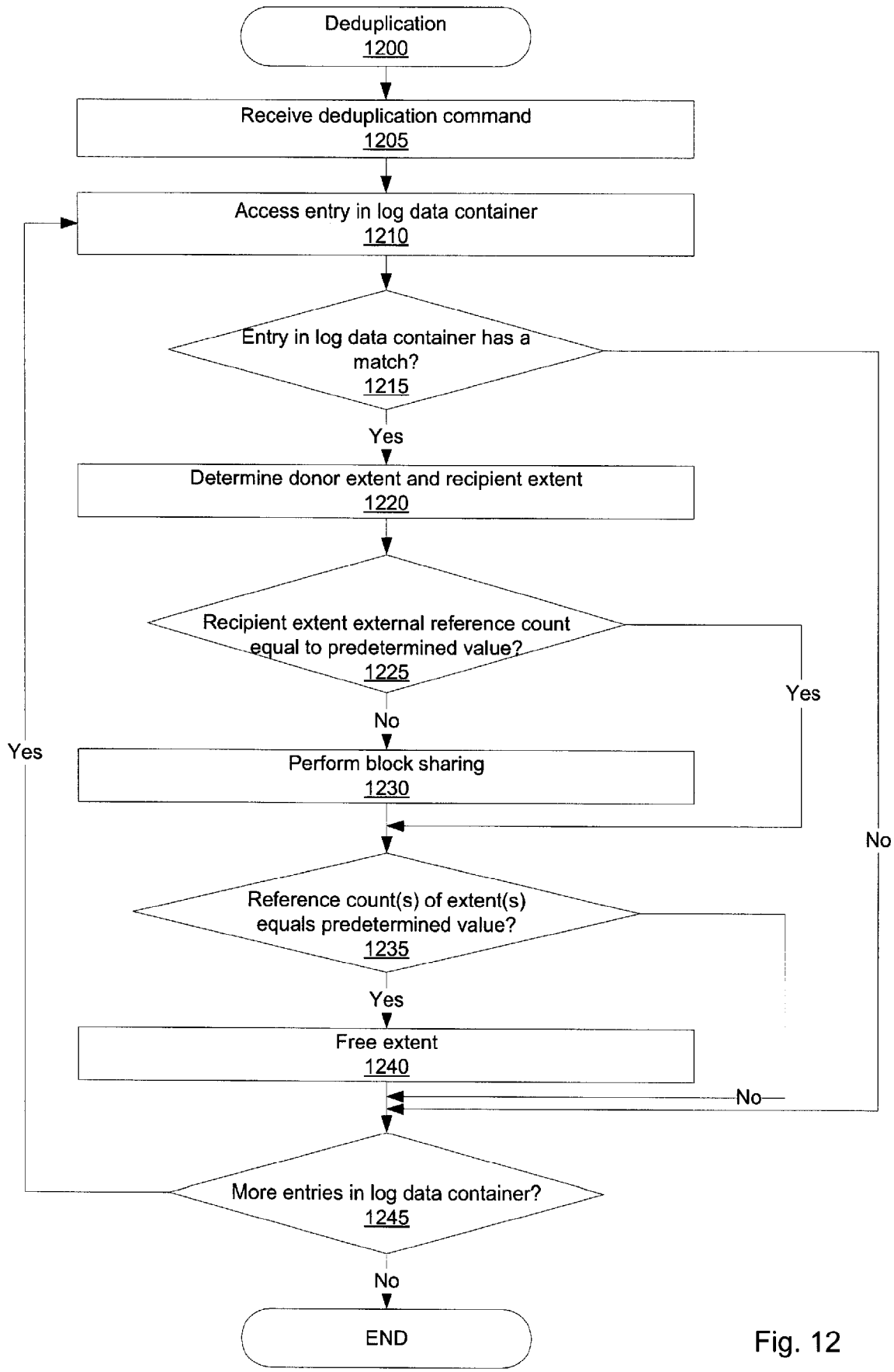
FIG. 12 illustrates a flow diagram of a deduplication in an extent-based architecture method according to another embodiment.

FIGS. 11-12 are flowcharts illustrating methods of deduplication in an extent-based architecture. FIG. 11 is a flow chart illustrating a method 1100 of deduplication in an extent-based architecture according to one embodiment. Referring to FIG. 11, the method 1100 may be performed by processing logic that comprises hardware (e.g., circuitry, dedicated logic, programmable logic, microcode, etc.), software (e.g., instructions run on a processing device to perform hardware simulation), or a combination thereof, represented by processing instruction blocks 1105-1135 in FIG. 11. In certain embodiments, method 1100 may be performed by storage server 210 of FIG. 2A, D-module 222 of FIG. 2B, operating system 314 of FIG. 3, and deduplication module 498 of FIG. 4.

A request to perform deduplication is received at processing instruction block 1105. The request may be received from a user or administrator that determines that deduplication must be performed. In an alternate embodiment, the request to perform deduplication is received periodically. In another alternate embodiment, the request to perform deduplication is received a predetermined time before a long retained snapshot or a snapshot that will be archived is taken. In one embodiment, a long retained snapshot is a snapshot that will be kept in persistent storage for a long period of time (e.g., one week, one month, one year, etc.). For example, if a long retained snapshot is taken every Sunday at midnight, and the deduplication process takes 2 hours, the request to perform deduplication can be set to occur on Sunday at noon in order to give enough time for the deduplication (of the snapshot) to be performed. The request to perform deduplication may include a specific snapshot to deduplicate. In an alternate embodiment, the most recent snapshot is the default snapshot for deduplication. In another alternate embodiment, all snapshots are deduplicated whenever a new snapshot is taken. In yet another alternate embodiment, data in the extent-based architecture other than snapshots is deduplicated.

A log data container is accessed at processing instruction block 1110. The log data container is a data structure for storing identifying information for each block in a physical volume (e.g., physical volume 525) that has been write allocated and/or modified. In one embodiment, the log data container is a file. In one embodiment, the log data container contains the extent ID and a fingerprint of the write allocated and/or modified data block. In an alternate embodiment, the log data container contains the extent ID and a pointer to a fingerprint accessible to the extent-based architecture 495. A fingerprint is a coded string of binary digits generated by a mathematical algorithm that uniquely identifies a data block. The fingerprint for the data block is generated by any method commonly known in the art. The fingerprint is stored in a fingerprint structure (not shown). Although the fingerprint structure is not in any of the Figures, one of skill in the art would understand that the fingerprint structure can be implemented in an operating system, in memory, in a fingerprint database accessible to the operating system/memory, etc.

In one embodiment, the log data container contains data blocks which have been allocated and/or modified since a previous snapshot was performed. In an alternate embodiment, the log data container contains all data blocks which have been allocated and/or modified since the physical volume was included in the system. In another alternate embodiment, the log data container contains the data blocks allocated for the snapshot received with the deduplication command. In one embodiment, the log data container can include a timestamp indicating when a data block was write allocated and/or modified. In an alternate embodiment, no timestamp is included in the log data container. The most recently write allocated or modified block is the most recent entry in the log data container. An entry in the log data container is accessed at processing instruction block 1115.

At processing instruction block 1115, the extent ID of the current entry is compared to the extent IDs of the other entries in the log data container. The extent IDs are compared by any method commonly known in the art. If the extent ID of the current entry matches the extent ID of another entry in the log data container, the method 1100 proceeds to block 1120. If the extent ID of the current entry does not match the extent ID of another entry in the log data container, the method 1100 proceeds to block 1135.

At processing block 1120, the reference count and pointer IDs for the matching entries are updated. In one embodiment, the internal reference count of the current entry is updated to include the internal reference count of the matching entry. For example, if the internal reference count of the current entry was four and the internal reference count of the matching entry was eight, the internal reference count of the current entry will be updated to twelve, the sum of four and eight. In this embodiment, the internal reference count of the matching entry will be updated to zero. In an alternate embodiment, the internal reference count of the matching entry is updated to include the internal reference count of the current entry. In this embodiment, the internal reference count of the current entry will be updated to zero. In one embodiment, if the internal reference count of the current entry is updated to include the internal reference count of the matching entry, the pointer of the matching entry extent ID will be updated to point to the extent ID of the current entry. In another embodiment, if the internal reference count of the matching entry is updated to include the internal reference count of the current entry, the pointer of the current entry extent ID will be updated to point to the extent ID of the matching entry.

At processing block 1125, a determination is made of whether a reference count of either the extent associated with the current entry or the extent associated with the matching entry is a predetermined value (e.g., zero). In one embodiment, the reference count is the external reference count for the extents. In an alternate embodiment, the reference count is the internal reference counts for the extents. In this embodiment, every internal reference count for the extent must equal the predetermined value for a match to occur. If the reference count of either extent equals the predetermined value, the method 1100 proceeds to block 1130. If the reference count of both extents does not equal the predetermined value, the method 1100 proceeds to block 1135.

At block 1130, the extent whose reference count equals the predetermined value is freed. The extent is freed by freeing the PVBNs comprising the extent and removing each mapping from the extent-to-physical block map 520 for the PBVNs. In one embodiment, freeing the extent also adds the extent identifier 710 back into the pool of extent identifiers which are free to be used. In an alternate embodiment, no pool of extent identifiers exists, and therefore the extent identifier 710 is not placed back into a pool of extent identifiers.

At processing block 1135, a determination is made of whether there are more entries in the log data container to process. If there are more entries in the log data container, the method 1100 returns to processing block 1110 to access the next entry in the log data container. If there are no more entries in the log data container, the method 1100 ends.

FIG. 12 is a flow chart illustrating a method 1200 of deduplication in an extent-based architecture according to another embodiment. Referring to FIG. 12, the method 1200 may be performed by processing logic that comprises hardware (e.g., circuitry, dedicated logic, programmable logic, microcode, etc.), software (e.g., instructions run on a processing device to perform hardware simulation), or a combination thereof, represented by processing instruction blocks 1205-1245 in FIG. 12. In certain embodiments, method 1100 may be performed by storage server 210 of FIG. 2A, D-module 222 of FIG. 2B, operating system 314 of FIG. 3, and deduplication module 498 of FIG. 4.

A request to perform deduplication is received at processing instruction block 1205. The request may be received from a user or administrator that determines that deduplication must be performed. In an alternate embodiment, the request to perform deduplication is received periodically. In another alternate embodiment, the request to perform deduplication is received a predetermined time before a long retained snapshot or a snapshot that will be archived is taken. For example, if a long retained snapshot is taken every Sunday at midnight, and the deduplication process takes 2 hours, the request to perform deduplication of the snapshot can be set to occur on Sunday at noon in order to give enough time for the deduplication of the snapshot to be performed. The request to perform deduplication may include a specific snapshot or data to deduplicate. In an alternate embodiment, the most recent snapshot is the default snapshot for deduplication. In another alternate embodiment, all snapshots are deduplicated whenever a new snapshot is taken. In yet another alternate embodiment, data in the extent-based architecture other than snapshots is deduplicated.

A log data container is accessed at processing instruction block 1210. In one embodiment, the log data container is a data structure for recording identifying information for each block in a physical volume (e.g., physical volume 525) that has been write allocated and/or modified. In one embodiment, the log data container is a log file. In one embodiment, the log data container contains the extent ID and a fingerprint of the write allocated and/or modified data block. In an alternate embodiment, the log data container contains the extent ID and a pointer to a fingerprint stored in a fingerprint database accessible to the extent-based architecture 495. The fingerprint for the data block is generated by any method commonly known in the art. In one embodiment, the log data container contains data blocks which have been allocated and/or modified since a previous snapshot was performed. In an alternate embodiment, the log data container contains all data blocks which have been allocated and/or modified since the physical volume was included in the system. In another alternate embodiment, the log data container contains the data blocks allocated for the snapshot received with the deduplication command. In one embodiment, the log data container can include a timestamp indicating when a data block was write allocated and/or modified. In an alternate embodiment, no timestamp is included in the log data container. The most recently write allocated or modified block is the most recent entry in the log data container. An entry in the log data container is accessed at processing instruction block 1215.

At processing block 1215, a determination is made of whether the current entry in the log data container has a match. In one embodiment, the determination is made by determining if a fingerprint associated with the current entry matches a fingerprint associated with any of the other entries in the log data container. In an alternate embodiment, the determination is made by determining if the fingerprint associated with the current entry matches a fingerprint stores in a fingerprint database. The fingerprints are compared by any method commonly known in the art.

If the fingerprint associated with the current entry is determined not to have a match, the method 1200 proceeds to block 1245. In one embodiment, if the fingerprint associated with the current entry is determined to have a match, a byte comparison is performed. In this embodiment, the byte comparison compares each byte in the data block associated with the current entry with each byte in the data block with the matching fingerprint. For example, if entry X has a fingerprint with a value Y, and entry Z is also determined to have a fingerprint with a value Y, each byte in the data block associated with entry X would be compared with each byte in the data block associated with entry Z. In an alternate embodiment, the byte comparison is not performed and the method 1200 proceeds to block 1220 if there is a fingerprint match for the current entry.

At processing block 1220, the donor extent and the recipient extent are determined based on the match. In one embodiment, the extent associated with the current entry is determined to be the donor extent and the extent associated with the matching entry is determined to be the recipient extent. In an alternate embodiment, the extent associated with the current entry is determined to be the recipient extent and the extent associated with the matching entry is determined to be the donor extent. In another embodiment, the timestamps of the current entry and matching entry are compared, and the donor extent is determined to be the older entry and the recipient extent is determined to be the newer entry. In another alternate embodiment, the timestamps of the current entry and matching entry are compared, and the donor extent is determined to be the newer entry and the recipient extent is determined to be the older entry.

At processing block 1225, a determination is made of whether the external reference count for the recipient extent is equal to a predetermined value (e.g., zero). If the external reference count for the recipient extent is equal to the predetermined value, the method 1200 proceeds to processing block 1235. For example, if the external reference count for the recipient extent is zero, the recipient extent must be an internal extent. If the recipient extent is an internal extent, block sharing between the donor extent and the recipient extent is not performed. If the recipient extent is not an internal extent (and is therefore an external extent), block sharing is performed at block 1230. The block sharing is performed as described below in conjunction with FIG. 13.

At processing block 1235, a determination is made if the reference counts of extents equal a predetermined value (e.g., zero). In one embodiment, the external reference counts are compared to the predetermined value. In an alternate embodiment, the internal reference counts are also compared to the predetermined value to determine if any PBVNs associated with the extents should also be freed. In one embodiment, the determination is made for each extent in the extent to physical block map (e.g., per-aggregate extent to physical block map 520). In an alternate embodiment, the determination is made for the donor extent and the recipient extent.

If the reference count of an extent does not equal the predetermined value (e.g., zero), the method 1200 proceeds to processing block 1245. If the reference count of an extent equals the predetermined value (e.g., zero), the extent is freed at processing block 1240. Feeing an extent is performed as described below in conjunction with FIG. 14.

At processing block 1245, a determination is made of whether there are more entries in the log data container to process. If there are more entries in the log data container, the method 1200 returns to processing block 1210 to access the next entry in the log data container. If there are no more entries in the log data container, the method 1200 ends.

Figure 13:
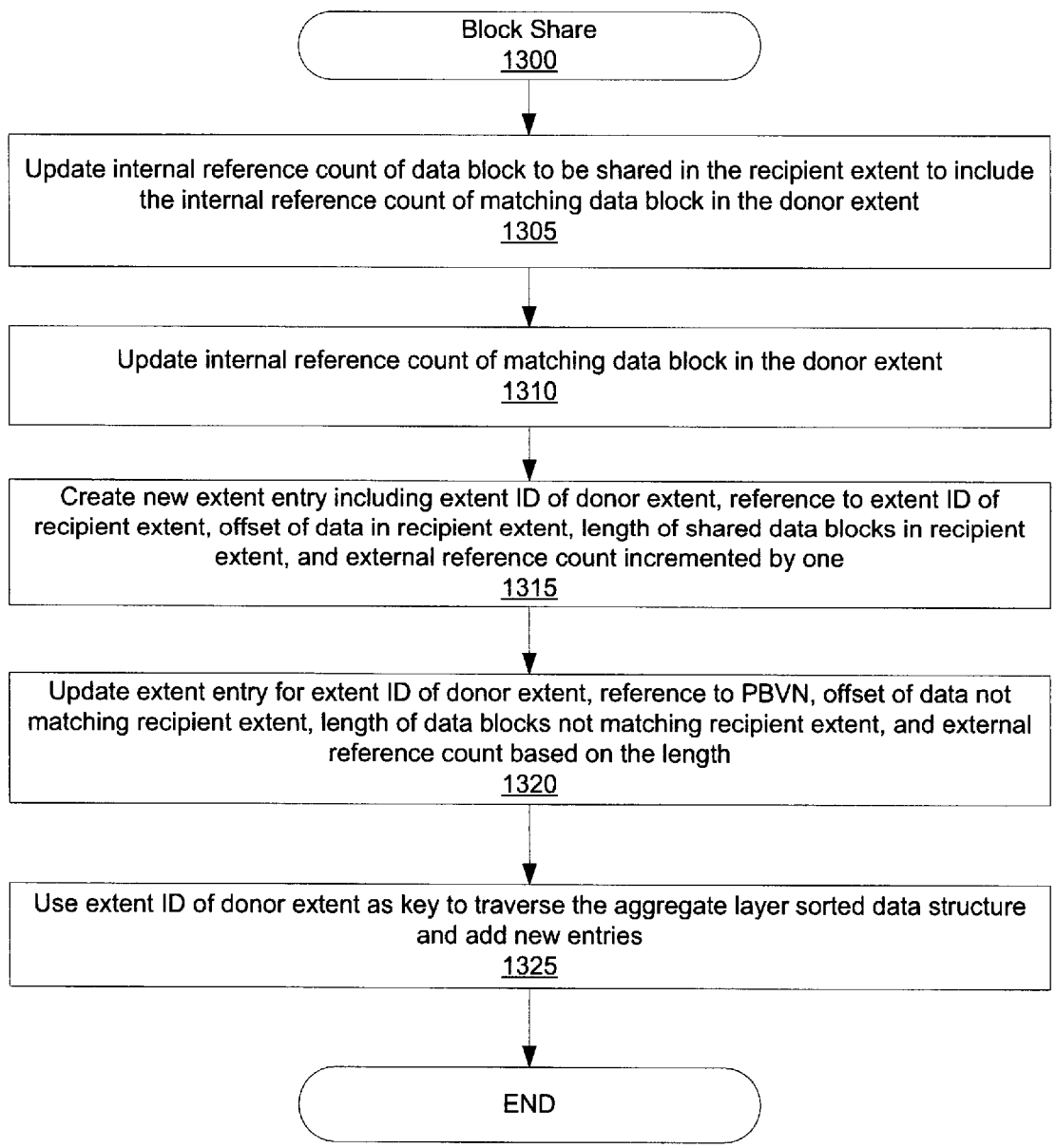
FIG. 13 illustrates a flow diagram of a block sharing method according to an embodiment.

FIG. 13 illustrates a flow diagram of a block sharing method according to an embodiment. Referring to FIG. 13, the method 1300 may be performed by processing logic that comprises hardware (e.g., circuitry, dedicated logic, programmable logic, microcode, etc.), software (e.g., instructions run on a processing device to perform hardware simulation), or a combination thereof, represented by processing instruction blocks 1305-1335 in FIG. 13 In certain embodiments, method 1300 may be performed by storage server 210 of FIG. 2A, D-module 222 of FIG. 2B, operating system 314 of FIG. 3, and deduplication module 498 of FIG. 4.

At processing block 1305, the internal reference count associated with the data block to be shared in the recipient extent is updated to include the internal reference count for the matching block in the donor extent. For example, if the internal reference count for the data block to be shared in the recipient extent was four and the internal reference count for the matching data block in the donor extent was eight, the internal reference count for the data block to be shared in the recipient would be updated to twelve. In one embodiment, the internal reference count for the data block to be shared in the recipient is updated by updating the extent entry for the extent ID of the recipient extent in the extent to physical data block map 520.

At processing block 1310, the internal reference count of the matching data block in the donor extent is updated to zero. In one embodiment, the internal reference count for the matching data block in the donor extent is updated by updating the extent entry for the extent ID of the donor extent in the extent to physical data block map 520.

At processing block 1315, a new extent map entry 800 is created including an extent identifier 805 set to the extent identifier of the donor extent, a reference 810 to the extent identifier of the recipient extent, an offset 815 equal to the offset of the data block to be shared in the recipient extent, a length 820 of the data block(s) to be shared, and an external reference count 825 incremented by one from the previous value (e.g., from zero to one). In one embodiment, the external reference count of the donor extent is incremented to prevent the level of indirect references in the extent to physical block map entries from becoming arbitrarily deep and taking an arbitrary amount of time (as measured in terms of disk I/O operations, assuming that each extent entry is likely to be stored within a different disk block and require a separate 110 operation). As used herein, deep refers to a number of levels of indirect references.

At processing block 1320, an extent entry for the donor extent is updated. An extent identifier 805 set to the extent identifier of the donor extent. A reference 810 is set to the PBVN of the data block to be shared. An offset 815 is set to the location of the first data block in the donor extent (e.g., if the first data block in the donor extent was shared and is no longer referenced by the donor extent, the offset would be set to one, which is the first block in the donor extent that is not being shared). A length 820 is set to the number of data blocks in the donor extent that were not shared (e.g., if one block was shared, and the extent had a length of eight, the length would be updated to seven). An external reference count 825 is decremented if the length 820 is zero. If the length of the donor extent is now zero, then the extent is no longer referencing any PBVNs, and therefore should be freed. In one embodiment, the extent entry for the donor extent is updated by overwriting the existing extent entry in the aggregate layer sorted data structure. In an alternate embodiment, the extent entry is updated by adding a new entry for the updated extent.

At processing block 1325, the storage server 210 uses the allocated extent identifier 805 as a key to traverse the aggregate layer extent-based sorted data structure 600 and adds the one or more new extent map entries 800.

Figure 14:
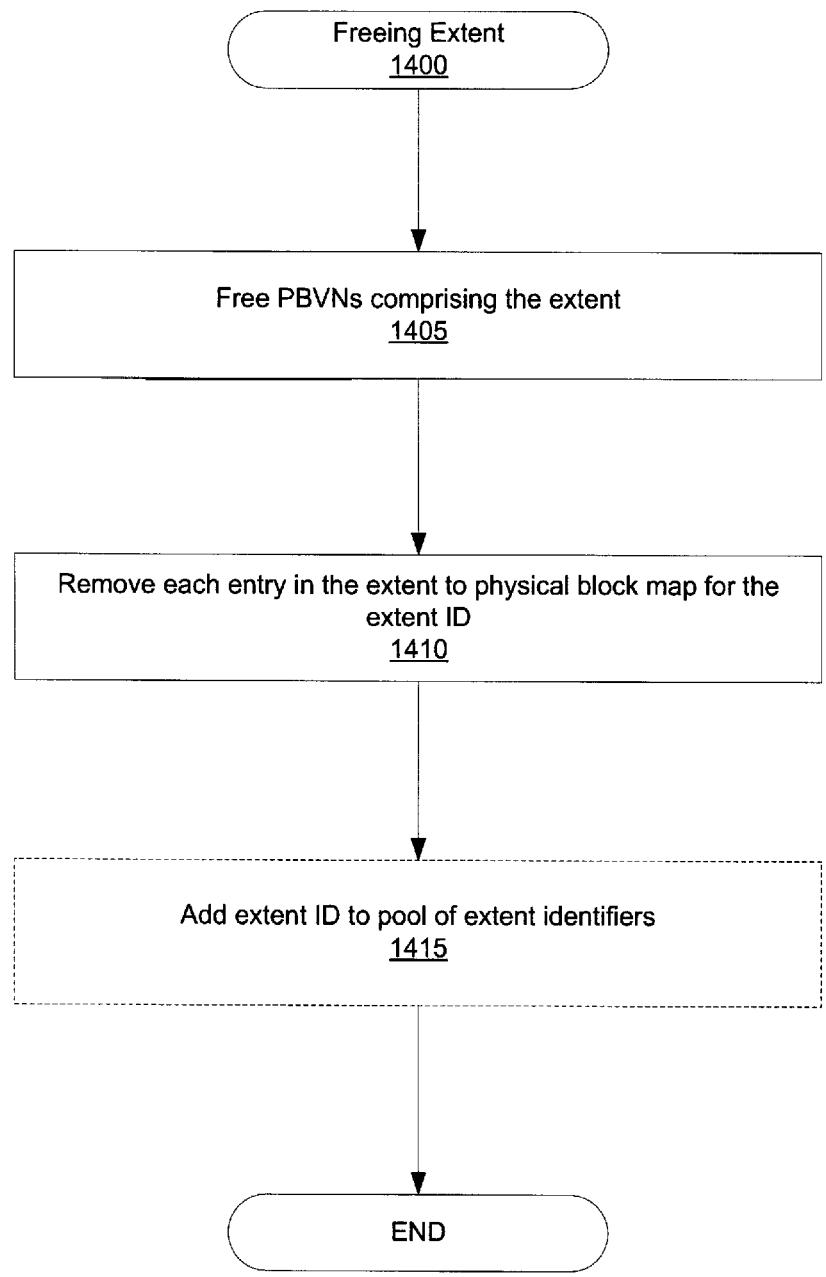
FIG. 14 illustrates a flow diagram of a freeing of extent method according to an embodiment.

FIG. 14 illustrates a flow diagram of a freeing extent method according to an embodiment. Referring to FIG. 14, the method 1400 may be performed by processing logic that comprises hardware (e.g., circuitry, dedicated logic, programmable logic, microcode, etc.), software (e.g., instructions run on a processing device to perform hardware simulation), or a combination thereof, represented by processing instruction blocks 1405-1415 in FIG. 14 In certain embodiments, method 1400 may be performed by storage server 210 of FIG. 2A, D-module 222 of FIG. 2B, operating system 314 of FIG. 3, and deduplication module 498 of FIG. 4.

At processing block 1405, the PVBNs comprising the extent are freed. The PVBNs are freed using methods commonly known in the art.

At processing block 1410, each entry in the extent-to-physical block map 520 for the extent ID and corresponding PBVNs is removed.

At processing block 1415, the extent identifier 710 of the extent being freed is added into a pool of extent identifiers which are free to be used. In an alternate embodiment, processing block 1415 is optional and is not performed. In one embodiment, processing block 1415 is optional if no pool of extent identifiers exists. In this embodiment, the extent identifier 710 is not placed back into a pool of extent identifiers. In certain embodiments, if processing block 1415 is omitted, the process ends from block 1410.

Thus, embodiments of deduplication in an extent-based architecture are implemented in a computer system as described herein. In practice, the methods 1100 and 1200 may constitute one or more programs made up of computer-executable instructions. Describing the methods with reference to the flowchart in FIG. 11, FIG. 12, FIG. 13, and FIG. 14 enables one skilled in the art to develop such programs, including such instructions to carry out the operations (acts) represented by logical blocks 1100 until 1135, 1200 until 1245, 1300 until 1325, and 1400 until 1415 on suitably configured computers (the processor of the computer executing the instructions from computer-readable media). The computer-executable instructions may be written in a computer programming language or may be embodied in firmware logic or in hardware circuitry. If written in a programming language conforming to a recognized standard, such instructions can be executed on a variety of hardware platforms and for interface to a variety of operating systems.

In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be further appreciated that more or fewer processes may be incorporated into the method illustrated in FIG. 11, FIG. 12, FIG. 13, and FIG. 14 without departing from the scope of the invention and that no particular order is implied by the arrangement of blocks shown and described herein.

Deduplication in an extent-based architecture has been described. Although specific embodiments have been illustrated and described herein, it will be appreciated by those of ordinary skill in the art that any arrangement which is determined to achieve the same purpose may be substituted for the specific embodiments shown. This application is intended to cover any adaptations or variations of the present invention.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "computer-readable storage medium" includes any type of volatile or non-volatile storage device that is accessible by a processor.

Therefore, it is manifestly intended that this invention be limited only by the following claims and equivalents thereof.

What is claimed is:

1. A computerized method for performing deduplication in an extent-based architecture including a storage server, the method comprising:
    receiving, by the storage server, a request to remove duplicate data in the storage server;
    accessing a log data container associated with a storage volume of the storage server, the log data container including a plurality of entries, wherein each entry is identified by an extent identifier in a data structure stored in a volume associated with the storage server; and
    matching an entry in the log data container with another entry in the log data container
    determining a donor extent and a recipient extent, and upon determining an external reference count associated with the recipient extent equals a first predetermined value, performing block sharing for the donor extent and the recipient extent, and upon determining the reference count of the donor extent equals a second predetermined value, freeing the donor extent.

2. The computerized method of claim 1, wherein the matching another entry in the log data container comprises:
    for each data block associated with the entry,
        comparing a fingerprint of the data block with a fingerprint of each data block associated with the another entry in the log data container; and
        performing a comparison of each byte in the data block with each corresponding byte in the another data block upon determining the fingerprint of the data block compares in a predetermined manner with the fingerprint of the another data block in the log data container;
    matching the data block to the another data block further comprises by comparing each byte in the data block in a predetermined manner with each corresponding byte in the another data block in the log data container.

3. The computerized method of claim 1, wherein determining a donor extent and a recipient extent is based on an age of the entry and an age of the another entry.

4. The computerized method of claim 1, wherein performing block sharing comprises:
    updating an internal reference count associated with the recipient extent to include an internal reference count associated with the donor extent;
    updating an internal reference count associated with the donor extent;
    creating a new extent entry;
    updating the donor extent; and
    updating the recipient extent.

5. The computerized method of claim 1, wherein freeing the donor extent comprises:
    freeing one or more data blocks associated with the donor extent; and
    removing one or more entries in an extent-to-physical map associated with the donor extent.

6. The computerized method of claim 1, wherein the donor extent is an extent associated with the entry and the recipient extent is an extent associated with the another entry.

7. The computerized method of claim 1, wherein the donor extent is an extent associated with the another entry and the recipient extent is an extent associated with the entry.

8. The computerized method of claim 1, wherein the first predetermined value is a value greater than zero and the second predetermined value is zero.

9. A non-transitory computer-readable storage medium embodied with executable instructions that cause a processor to perform operations for deduplication in an extent-based architecture including a storage server, the operations comprising:
    receiving a request to remove duplicate data in the storage server;
    accessing a log data container associated with a storage volume of the storage server, the log data container including a plurality of entries, wherein each entry is identified by an extent identifier in a data structure stored in a volume associated with the storage server; and
    matching an entry in the log data container with another entry in the log data container determining a donor extent and a recipient extent, and upon determining an external reference count associated with the recipient extent equals a first predetermined value, performing block sharing for the donor extent and the recipient extent, and upon determining the reference count of the donor extent equals a second predetermined value, freeing the donor extent.

10. The non-transitory computer-readable storage medium of claim 9, wherein the matching another entry in the log data container comprises:

for each data block associated with the entry,
comparing a fingerprint of the data block with a fingerprint of each data block associated with the another entry in the log data container; and
performing a comparison of each byte in the data block with each corresponding byte in the another data block upon determining the fingerprint of the data block compares in a predetermined manner with the fingerprint of the another data block in the log data container;
matching the data block to the another data block further comprises by comparing each byte in the data block in a predetermined manner with each corresponding byte in the another data block in the log data container.

11. The non-transitory computer-readable storage medium of claim 9, wherein determining a donor extent and a recipient extent is based on an age of the entry and an age of the another entry.

12. The non-transitory computer-readable storage medium of claim 9, wherein performing block sharing comprises:
updating an internal reference count associated with the recipient extent to include an internal reference count associated with the donor extent;
updating an internal reference count associated with the donor extent;
creating a new extent entry;
updating the donor extent; and
updating the recipient extent.

13. The non-transitory computer-readable storage medium of claim 9, wherein freeing the donor extent comprises:
freeing one or more data blocks associated with the donor extent; and
removing one or more entries in an extent-to-physical map associated with the donor extent.

14. The non-transitory computer-readable storage medium of claim 9, wherein the donor extent is an extent associated with the entry and the recipient extent is an extent associated with the another entry.

15. The non-transitory computer-readable storage medium of claim 9, wherein the donor extent is an extent associated with the another entry and the recipient extent is an extent associated with the entry.

16. The non-transitory computer-readable storage medium of claim 9, wherein the first predetermined value is a value greater than zero and the second predetermined value is zero.

17. A computerized system comprising:
a processor coupled to a memory through a bus; and
instructions executed from the memory by the processor to cause the processor to receive a request to remove duplicate data in the computerized system;
access a log data container associated with a storage volume of the storage server, the log data container including a plurality of entries, wherein each entry is identified by an extent identifier in a data structure stored in a volume associated with the storage server; and
match an entry in the log data container with another entry in the log data container
determine a donor extent and a recipient extent, and upon determining an external reference count associated with the recipient extent equals a first predetermined value, performing block sharing for the donor extent and the recipient extent, and upon determining the reference count of the donor extent equals a second predetermined value, freeing the donor extent.

18. The computerized system of claim 17, wherein to matching the entry to another entry in the log data container comprises:

for each data block associated with the entry,
compare a fingerprint of the data block with a fingerprint of each data block associated with the another entry in the log data container; and
perform a comparison of each byte in the data block with each corresponding byte in the another data block upon determining the fingerprint of the data block compares in a predetermined manner with the fingerprint of the another data block in the log data container;
match the data block to the another data block further comprises by comparing each byte in the data block in a predetermined manner with each corresponding byte in the another data block in the log data container.

19. The computerized system of claim 17, wherein to determine a donor extent and a recipient extent is based on an age of the entry and an age of the another entry.

20. The computerized system of claim 17, wherein to perform block sharing comprises:
updating an internal reference count associated with the recipient extent to include an internal reference count associated with the donor extent;
updating an internal reference count associated with the donor extent;
creating a new extent entry;
updating the donor extent; and
updating the recipient extent.

21. The computerized system of claim 17, wherein to free the donor extent comprises:
freeing one or more data blocks associated with the donor extent; and
removing one or more entries in an extent-to-physical map associated with the donor extent.

22. A computerized system comprising:
a storage server coupled to a storage device, the storage server operative to:
receive a request to remove duplicate data in a storage server;
access a log data container associated with a storage volume of the storage server, the log data container including a plurality of entries, wherein each entry is identified by an extent identifier in a data structure stored in a volume associated with the storage server; and
match an entry in the log data container with another entry in the log data container
determine a donor extent and a recipient extent, and upon determining an external reference count associated with the recipient extent equals a first predetermined value, performing block sharing for the donor extent and the recipient extent, and upon determining if the reference count of the donor extent equals a second predetermined value, freeing the donor extent.

23. A computerized method comprising:

receiving, by a storage server, a request to remove duplicate data in the storage server;

accessing a log data container associated with a storage volume of the storage server, the log data container including a plurality of entries, wherein each entry is identified by an extent identifier in a data structure stored in a volume associated with the storage server; and matching an extent identifier associated with an entry to an extent identifier associated with another entry in the log data container, updating a reference count and a pointer identifier of the extent identifier associated with the entry, updating a reference count and a pointer identifier of the extent identifier associated with the another entry, freeing the extent identified by the extent identifier associated with the entry when the reference count of the extent identifier associated with the entry equals the predetermined value, and freeing the extent identified by the extent identifier associated with the another entry when the reference count of the extent identifier associated with the another entry equals the predetermined value.

24. A non-transitory computer-readable storage medium embodied with executable instructions that cause a processor to perform operations comprising:

receiving a request to remove duplicate data in a storage server;

accessing a log data container associated with a storage volume of the storage server, the log data container including a plurality of entries, wherein each entry is identified by an extent identifier in a data structure stored in a volume associated with the storage server; and matching an extent identifier associated with an entry to an extent identifier associated with another entry in the log data container, updating a reference count and a pointer identifier of the extent identifier associated with the entry, updating a reference count and a pointer identifier of the extent identifier associated with the another entry, freeing the extent identified by the extent identifier associated with the entry when the reference count of the extent identifier associated with the entry equals the predetermined value, and freeing the extent identified by the extent identifier associated with the another entry when the reference count of the extent identifier associated with the another entry equals the predetermined value.

25. A computerized system comprising:

a processor coupled to a memory through a bus; and instructions executed from the memory by the processor to cause the processor to receive a request to remove duplicate data in a storage server;

access a log data container associated with a storage volume of the storage server, the log data container including a plurality of entries, wherein each entry is identified by an extent identifier in a data structure stored in a volume associated with the storage server; and if match an extent identifier associated with an entry to an extent identifier associated with another entry in the log data container, update a reference count and a pointer identifier of the extent identifier associated with the entry, update a reference count and a pointer identifier of the extent identifier associated with the another entry, free the extent identified by the extent identifier associated with the entry when the reference count of the extent identifier associated with the entry equals the predetermined value, and free the extent identified by the extent identifier associated with the another entry when the reference count of the extent identifier associated with the another entry equals the predetermined value.

26. A computerized system comprising:

a storage server coupled to a storage device, the storage server operative to:

receive a request to remove duplicate data in a storage server;

access a log data container associated with a storage volume of the storage server, the log data container including a plurality of entries, wherein each entry is identified by an extent identifier in a data structure stored in a volume associated with the storage server; and match an extent identifier associated with an entry to an extent identifier associated with another entry in the log data container, update a reference count and a pointer identifier of the extent identifier associated with the entry, update a reference count and a pointer identifier of the extent identifier associated with the another entry, free the extent identified by the extent identifier associated with the entry when the reference count of the extent identifier associated with the entry equals the predetermined value, and free the extent identified by the extent identifier associated with the another entry when the reference count of the extent identifier associated with the another entry equals the predetermined value.

* * * * *